(12) United States Patent
Guedalia et al.

(10) Patent No.: US 6,907,112 B1
(45) Date of Patent: Jun. 14, 2005

(54) METHOD AND SYSTEM FOR VOICE MESSAGING

(75) Inventors: Jacob L. Guedalia, Newton, MA (US); David Guedalia, Beit Shemesh (IL); Josh Guedalia, Beit Shemesh (IL)

(73) Assignee: NMS Communications, Framingham, MA (US)

( * ) Notice: Subject to any disclaimer, the term of this patent is extended or adjusted under 35 U.S.C. 154(b) by 0 days.

(21) Appl. No.: 09/444,545

(22) Filed: Nov. 22, 1999

(30) Foreign Application Priority Data

Jul. 27, 1999 (IL) ................................. 131135

(51) Int. Cl.[7] ............................................... H04M 3/42
(52) U.S. Cl. ................................ 379/88.17; 379/88.14; 709/206
(58) Field of Search ........................... 379/88.12, 88.13, 379/88.14, 88.16, 88.17, 88.18; 709/200, 206; 455/414.4

(56) References Cited

U.S. PATENT DOCUMENTS

| | | | |
|---|---|---|---|
| 5,557,659 A | * 9/1996 | Hyde-Thomson | ........ 379/88.13 |
| 5,701,511 A | 12/1997 | Smith | |
| 5,737,395 A | 4/1998 | Irribarren | |
| 5,742,773 A | 4/1998 | Blomfield-Brown et al. | |
| 5,870,454 A | 2/1999 | Dahlen | |
| 6,023,779 A | 2/2000 | Fullam et al. | |
| 6,175,619 B1 | 1/2001 | DeSimone | |
| 6,181,781 B1 | * 1/2001 | Porter et al. | ............. 379/88.17 |
| 6,192,111 B1 | * 2/2001 | Wu | .......................... 379/88.13 |
| 6,203,192 B1 | * 3/2001 | Fortman | .................. 379/88.14 |
| 6,219,694 B1 | 4/2001 | Lazaridis et al. | |
| 6,232,888 B1 | 5/2001 | Davis et al. | |
| 6,233,318 B1 | 5/2001 | Picard et al. | |
| 6,240,164 B1 | 5/2001 | Jensen | |
| 6,269,336 B1 | * 7/2001 | Ladd et al. | .................. 704/270 |
| 6,282,270 B1 | * 8/2001 | Porter | ..................... 379/88.17 |
| 6,301,609 B1 | * 10/2001 | Aravamudan et al. | ...... 709/207 |
| 6,304,573 B1 | 10/2001 | Hicks, III | |
| 6,404,762 B1 | * 6/2002 | Luzeski et al. | ............. 370/352 |
| 2001/0012286 A1 | * 8/2001 | Huna et al. | ................. 370/352 |
| 2001/0033564 A1 | * 10/2001 | Hickman | .................... 370/352 |
| 2002/0131561 A1 | * 9/2002 | Gifford et al. | ............. 379/67.1 |

OTHER PUBLICATIONS

Victor W. Zue "Navigating the Information Superhighway Using Spoken Language Interfaces", IEEE Expert, Oct. 1995, pp. 39–43.

Matthew Lennig, "Putting Speech Recognition to Work in the Telephone Network", IEEE Institute of Electrical and Electronic Engineers, Aug. 1990, pp. 35–41.

(Continued)

*Primary Examiner*—Scott L. Weaver
(74) *Attorney, Agent, or Firm*—Barry W. Chapin, Esq.; Chapin & Huang, LLC

(57) ABSTRACT

This invention discloses a voice communication system including a telephone network including a multiplicity of telephones interconnected by telephone network interconnections, a computer network having a multiplicity of nodes and enabling e-mail communication between said nodes, a multiplicity of voice response computers, each voice response computer being connected to a node of the computer network and being actuable by an input received from one of the multiplicity of telephones via the telephone network for communicating voice received via said one of the multiplicity of telephones via e-mail over the computer network.

A method of voice communication including a telephone network including a multiplicity of telephones interconnected by telephone network interconnections is also disclosed.

128 Claims, 14 Drawing Sheets

OTHER PUBLICATIONS

Frank Stajano, et al., "The Thinnest of Clients: Controlling It All Via Cellphone", Mobile Computing and Communications Review, vol. 2, No. 4, Oct. 1998.

Webpage: http://www.dialogic.com ("Dialogic—Making Computer Telephony Happen").

Webpage: http://www.Microsoft.com("Microsoft Speech API 4.0").

AcuVoice reference information: http//www.acuvoice.com ("Fonix Corporation—The Human Computer Interaction Leader").

Hotmail reference information: http://www.hotmail.com.

ICQ reference information: http://www.icq.com ("ICQ—World's Largest Internet Online Communication Network").

Webpage: http://www.realaudio.com ("Real Player Information").

Webpage: http://www.lhs.com/products ("Lernout & Hauspie Product Overview").

Motorola reference information: http://www.phone.com ("Motorola—Products and Services").

* cited by examiner

METHOD AND SYSTEM FOR VOICE MESSAGING

FIELD OF THE INVENTION

The present invention relates to management of electronic mail.

BACKGROUND OF THE INVENTION

Electronic mail, or e-mail, is fast becoming a dominant mode of communication. In its primitive form, e-mail is managed by two kinds of computer software: namely, e-mail server software (referred to simply as "e-mail servers") and e-mail client software (referred to simply as "e-mail clients"). E-mail servers reside on centrally accessed computers (referred to as "server computers"), and manage incoming and outgoing e-mail for remote users who are authorized to use such server computers. E-mail servers maintain separate mail accounts for each authorized user, into which incoming mail is stored. E-mail clients reside on remote computers (referred to as "client computers") and manage incoming and outgoing mail for designated users. E-mail clients are responsible for downloading arriving mail items from the server computer at which they are located. E-mail clients are also responsible for transmitting outgoing mail from a remote client computer to a server computer. Examples of popular e-mail clients for personal computers are EUDORA R, INTERNET EXPLORER R and NETSCAPE R.

Standard e-mail uses a protocol named Simple Mail Transport Protocol (SMTP) for sending outgoing messages, and a protocol named Post Office Protocol (POP) for receiving incoming messages. Other techniques and protocols for sending and receiving e-mail may also be used, as appropriate. For example web based e-mail, using the HTTP protocol may be employed.

For use over the Internet, MultiPart Internet Mail Extension (MIME) extends the format of Internet mail to allow non-US-ASCII textual messages, non-textual messages, multipart message bodies and non-US-ASCII information in message headers. Attachments to e-mail messages can be included within a multipart e-mail. One of the drawbacks with e-mail, however, is the need for a user to be connected to the Internet in order to receive or send his e-mail.

Although Internet access is available in many homes and offices, and Internet stations are available in many public areas, being "un-wired" is still a concern for mobile users who are neither at home nor in their office. When on the road, a user often finds himself unable to access his e-mail, for a variety of reasons.

SUMMARY OF THE INVENTION

This invention seeks to provide an apparatus and method for a voice communication system for the management of voice messaging.

There is thus provided in accordance with a preferred embodiment of the present invention a voice communication system including a telephone network which includes a multiplicity of telephones interconnected by telephone network interconnections, a computer network having a multiplicity of nodes and enabling e-mail communication between the nodes, a multiplicity of voice response computers, each voice response computer being connected to a node of the computer network and being actuable by an input received from one of the multiplicity of telephones via the telephone network for communicating voice received via the one of the multiplicity of telephones via e-mail over the computer network.

Further in accordance with a preferred embodiment of the present invention, the voice communication system also provides buddy functionality whereby communications are sent to user-selected buddies via the computer network.

Still further in accordance with a preferred embodiment of the present invention, the voice communication system also provides buddy functionality whereby communications are sent to user-selected buddies via the computer network indicating that a user is communicating using a user's telephone via the telephone network with a user's voice response computer.

Additionally in accordance with a preferred embodiment of the present invention, the communication system also provides buddy functionality whereby communications are sent to user-selected buddies via the computer network indicating that a user has communicated voice via the telephone network and the computer network using a user's telephone and a user's voice response computer.

Moreover in accordance with a preferred embodiment of the present invention the voice response computers are operative to convert Digital Tone Multi Frequency (DTMF) to a buddy communication protocol.

Additionally in accordance with a preferred embodiment of the present invention the voice response computers communicate with a database. Preferably the database is an SOL database.

Further in accordance with a preferred embodiment of the present invention the multiplicity of voice response computers is actuated by the sender choosing an e-mail address of a recipient from a pre-defined directory.

Furthermore the multiplicity of voice response computers are actuated by the sender entering an e-mail address of a recipient via DTMF codes. Preferably the multiplicity of voice response computers are operative to store in a directory, e-mail addresses entered by a sender.

Still further in accordance with a preferred embodiment of the present invention the multiplicity of voice response computers is actuated by the sender entering an e-mail address of a recipient via speech recognition by one of said multiplicity of voice response computers.

There is also provided in accordance with a preferred embodiment of the present invention a voice communication system including a telephone network including a multiplicity of telephones interconnected by telephone network interconnections, a computer network having a multiplicity of nodes and enabling e-mail communication between the nodes, a multiplicity of voice response computers, each voice response computer being connected to a node of the computer network and being actuable by an input received from one of the multiplicity of voice response computers via the computer network for receiving voice communicated via e-mail over the computer network and providing a voice output to a telephone via the telephone network.

Further in accordance with a preferred embodiment of the present invention, the communication system also provides buddy functionality whereby communications are sent from user-selected buddies via the computer network.

Still further in accordance with a preferred embodiment of the present invention, the communication system also provides buddy functionality whereby communications are sent from user-selected buddies via the computer network indicating that a user is communicating using a user's telephone via the telephone network with a user's voice response computer.

Additionally in accordance with a preferred embodiment of the present invention, the communication system also provides buddy functionality whereby communications are sent from user-selected buddies via the computer network indicating that a user has communicated voice via the telephone network and the computer network using a user's telephone and a user's voice response computer.

Moreover in accordance with a preferred embodiment of the present invention the voice response computers are capable of sensing the presence of a link to an audio file in e-mail received thereat.

There is also provided in accordance with yet another preferred embodiment of the present invention a voice communication system including a telephone network including a multiplicity of telephones interconnected by telephone network interconnections, a computer network having a multiplicity of nodes and enabling e-mail communication between the nodes, a multiplicity of voice response computers, each voice response computer being connected to a node of the computer network and being actuable by an input received from one of the multiplicity of telephones via the telephone network for communicating voice received via said one of said multiplicity of telephones via e-mail over the computer network, each voice response computer also being actuable by an input received from one of the multiplicity of voice response computers via the computer network for receiving voice communicated via e-mail over the computer network and providing a voice output to a telephone via the telephone network.

Further in accordance with a preferred embodiment of the present invention, the communication system also provides buddy functionality whereby communications are sent to user-selected buddies via the computer network.

Still further in accordance with a preferred embodiment of the present invention, the communication system also provides buddy functionality whereby communications are sent to user-selected buddies via the computer network indicating that a user is communicating using a user's telephone via the telephone network with a user's voice response computer.

Additionally in accordance with a preferred embodiment of the present invention, the communication system also provides buddy functionality whereby communications are sent to user-selected buddies via the computer network indicating that a user has communicated voice via the telephone network and the computer network using a user's telephone and a user's voice response computer.

There is further provided in accordance with a preferred embodiment of the present invention a voice communication system including a telephone network including a multiplicity of telephones interconnected by telephone network interconnections, a computer network having a multiplicity of nodes and enabling e-mail communication between the nodes, a multiplicity of voice response computers, each voice response computer being connected to a node of the computer network and being actuable by an input received from one of the multiplicity of telephones via the telephone network for communicating voice received via the one of the multiplicity of telephones via a non-streaming Internet protocol over the computer network.

Further in a accordance with a preferred embodiment of the present invention, the communication system also provides buddy functionality whereby communications are sent to user-selected buddies via the computer network.

Still further in accordance with a preferred embodiment of the present invention, the communication system also provides buddy functionality whereby communications are sent to user-selected buddies via the computer network indicating that a user is communicating using a user's telephone via the telephone network with a user's voice response computer.

Additionally in accordance with a preferred embodiment of the present invention, the communication system also provides buddy functionality whereby communications are sent to user-selected buddies via the computer network indicating that a user has communicated voice via the telephone network and the computer network using a user's telephone and a user's voice response computer. Preferably the voice response computers are operative to convert DTMF to a buddy communication protocol.

Moreover in accordance with a preferred embodiment of the present invention the multiplicity of voice response computers is actuated by the sender choosing an e-mail address of a recipient from a pre-defined directory.

Furthermore in the communication system the multiplicity of voice response computers are actuated by the sender entering an e-mail address of a recipient via DTMF codes. Preferably the multiplicity of voice response computers are operative to store in a directory, e-mail addresses entered by a sender.

Additionally in accordance with a preferred embodiment of the present invention the multiplicity of voice response computers is actuated by the sender entering an e-mail address of a recipient via speech recognition by one of the multiplicity of voice response computers.

There is also provided in accordance with a preferred embodiment of the present invention a voice communication system including a telephone network including a multiplicity of telephones interconnected by telephone network interconnections, a computer network having a multiplicity of nodes and enabling non-streaming Internet protocol communication between the nodes, a multiplicity of voice response computers, each voice response computer being connected to a node of the computer network and being actuable by an input received from one of the multiplicity of voice response computers via the computer network for receiving voice communicated via a non-streaming internet protocol over the computer network and providing a voice output to a telephone via the telephone network.

Further in accordance with a preferred embodiment of the present invention, the communication system also provides buddy functionality whereby communications are sent from user-selected buddies via the computer network.

Still further in accordance with a preferred embodiment of the present invention, the communication system also provides buddy functionality whereby communications are sent from user-selected buddies via the computer network indicating that a user is communicating using a user's telephone via the telephone network with a user's voice response computer.

Additionally in accordance with a preferred embodiment of the present invention, the communication system also provides buddy functionality whereby communications are sent from user-selected buddies via the computer network indicating that a user has communicated voice via the telephone network and the computer network using a user's telephone and a user's voice response computer.

Further in accordance with a preferred embodiment of the present invention the voice response computers are capable of sensing the presence of a link to an audio file in e-mail received thereat.

Preferably the voice response computers are capable of sensing the presence of a link to an audio file in e-mail received thereat. Additionally the voice response computers may be capable of accessing said audio file via the link for playing the audio file to a recipient.

There is provided in accordance with yet another preferred embodiment of the present invention a voice communication system including a telephone network including a multiplicity of telephones interconnected by telephone network interconnections, a computer network having a multiplicity of nodes and enabling e-mail communication between the nodes, a multiplicity of voice response computers, each voice response computer being connected to a node of the computer network and being actuable by an input received from one of the multiplicity of telephones via the telephone network for communicating voice received via the one of the multiplicity of telephones via a non-streaming Internet protocol over the computer network, each voice response computer also being actuable by an input received from one of the multiplicity of voice response computers via the computer network for receiving voice communicated via a non-streaming Internet protocol over the computer network and providing a voice output to a telephone via the telephone network.

Further in accordance with a preferred embodiment of the present invention, the communication system also provides buddy functionality whereby communications are sent to user-selected buddies via the computer network.

Still further in accordance with a preferred embodiment of the present invention, the communication system also provides buddy functionality whereby communications are sent to user-selected buddies via the computer network indicating that a user is communicating using a user's telephone via the telephone network with a user's voice response computer.

Additionally in accordance with a preferred embodiment of the present invention, the communication system also provides buddy functionality whereby communications are sent to user-selected buddies via the computer network indicating that a user has communicated voice via the telephone network and the computer network using a user's telephone and a user's voice response computer.

There is also provided in accordance with a preferred embodiment of the present invention a communication system including a cellular telephone network including a multiplicity of telephones interconnected by telephone network interconnections, a computer network having a multiplicity of nodes and enabling communication between the nodes, a multiplicity of computers, each computer being connected to a node of the computer network and being actuable by an input received from one of the multiplicity of telephones via the telephone network for communicating messages received via the one of the multiplicity of telephones via a telephone compatible Internet communication language over the computer network, at least one of senders or recipients of the messages being user-selected buddies.

There is provided in a accordance with yet another preferred embodiment of the present invention a communication system including a cellular telephone network including a multiplicity of telephones interconnected by telephone network interconnections, a computer network having a multiplicity of nodes and enabling communication between the nodes, a multiplicity of computers, each computer being connected to a node of the computer network and being actuable by an input received from one of the multiplicity of voice response computers-via the computer network for receiving messages communicated via a telephone compatible Internet communication language over the computer network and providing a telephone compatible Internet communication language output to a telephone via the telephone network, at least one of senders or recipients of the messages being user-selected buddies.

There is also provided in accordance with yet a further embodiment of the present invention a communication system including a cellular telephone network including a multiplicity of telephones interconnected by telephone network interconnections, a computer network having a multiplicity of nodes and enabling communication between the nodes, a multiplicity of computers, each computer being connected to a node of the computer network and being actuable by an input received from one of the multiplicity of telephones via the telephone network for communicating messages received via the one of the multiplicity of telephones via a telephone compatible Internet communication language over the computer network, each computer also being actuable by an input received from one of the multiplicity of computers via the computer network for receiving messages communicated over the computer network and providing a telephone compatible Internet communication language output to a telephone via the telephone network, at least one of senders or recipients of the messages being user-selected buddies.

There is further provided in accordance with yet another preferred embodiment of the present invention a communication system for use with a computer network which includes a recorder recording a sender's voice, a web server storing the sender's voice, and a notifier sending a notification to at least one recipient, the notification containing a link enabling retrieval of the sender's voice from the web server.

Further in accordance with a preferred embodiment of the present invention, the recorder employs a telephone network.

Still further in accordance with a preferred embodiment of the present invention the recorder employs a microphone outputting to a computer.

Additionally in accordance with a preferred embodiment of the present invention the web server stores the sender's voice together with the meta-information associated therewith in a single storage unit. Preferably the recorder spools the sender's voice to a local storage facility.

Additionally or alternatively the communication system includes transmitter transmitting a sender's voice. In the communication system the transmitter transmits the sender's voice via HTTP PUT to the web server, and also encodes a sender's voice in a compressed format. Furthermore the transmitter may also spool the sender's voice to an SMTP server.

The web server may also include an SMTP server, and an HTTP server enabled to handle PUT commands.

Still further in accordance with a preferred embodiment of the present invention the web server encodes said sender's voice in a streaming format.

Additionally in accordance with a preferred embodiment of the present invention the web server is operative to encode multiple senders' voices simultaneously. The web server may also include functionality which associates user preferences with recorded user voice elements.

Moreover in accordance with a preferred embodiment of the present invention, the communication system also includes the functionality of formatting the notification as a function of at least one parameter of the recipient.

Further in accordance with a preferred embodiment of the present invention, the communication system also includes the functionality of formatting the notification for a plurality of participants as a function of at least one parameter of each recipient.

Still further in accordance with a preferred embodiment of the present invention the link connects to at least an advertising medium. Preferably the link also connects to an audio file.

There is also provided in accordance with preferred embodiment of the present invention a communication system including a telephone network including a multiplicity of telephones interconnected by telephone network interconnections, a computer network having a multiplicity of nodes and enabling communication between the nodes, at least one web server connected to one of the multiplicity of nodes, and at least one voice response computer connected to one of the multiplicity of nodes, and includes the following: at least one of the multiplicity of telephones communicates data with the at least one web server using a telephone compatible Internet communication language, at least one of the multiplicity of telephones communicates voice with the at least one voice response computer, and at least one of the multiplicity of telephones communicates identification information to the at least one voice response computer, the identification information establishing a connection between the voice and the data.

There is also provided in accordance with yet another preferred embodiment of the present invention a communication system including a telephone network including a multiplicity of telephones interconnected by telephone network interconnections, a computer network having a multiplicity of nodes and enabling communication between the nodes, at least one web server connected to one of the multiplicity of nodes, and at least one voice response computer connected to one of the multiplicity of nodes, and the communication system also includes at least one of the multiplicity of telephones communicates data with the at least one web server using a telephone compatible Internet communication language, at least one of the multiplicity of telephones communicates voice with the at least one voice response computer, at least one of the multiplicity of telephones communicates identification information to the at least one voice response computer, the identification information establishing a connection between the voice and the data, and the at least one voice response computer records the voice received from the at least one of the multiplicity of telephones.

There is provided in accordance with yet another preferred embodiment of the present invention a communication system including a telephone network including a multiplicity of telephones interconnected by telephone network interconnections, a computer network having a multiplicity of nodes and enabling communication between the nodes, at least one web server connected to one of the multiplicity of nodes, and at least one voice response computer connected to one of the multiplicity of nodes and wherein at least one of the multiplicity of telephones communicates data with the at least one web server using a telephone compatible Internet communication language, at least one of the multiplicity of telephones communicates voice with the at least one voice response computer, and at least one of the multiplicity of telephones communicates identification information to the at least one voice response computer, the identification information establishing a connection between the voice and the data, the at least one voice response computer records the voice received from the at least one of the multiplicity of telephones and stores the voice on the web server, and a notification is sent to at least one recipient, the notification containing a link enabling retrieval of the voice from the web server.

There is provided in accordance with yet another preferred embodiment of the present invention a communication system including a computer network having a multiplicity of nodes and enabling e-mail communication between the nodes, and at least one database connected to the computer network and storing e-mail communications between the nodes.

Further in accordance with a preferred embodiment of the present invention and wherein each of the multiplicity of databases contains a plurality of mail tables, wherein each mail table has assigned thereto a limited number of users.

Still further in accordance with a preferred embodiment of the present invention at least one of the multiplicity of databases includes a list of destination addresses.

Additionally in accordance with a preferred embodiment of the present invention, the list includes a multiplicity of lists of destination addresses. Preferably at least one of said multiplicity of databases includes a meta-list for indexing the multiplicity of lists.

There is further provided in accordance with yet another preferred embodiment of the present invention a method for management of electronic mail, including the steps of converting an e-mail message from text to speech; receiving an input request for a selected e-mail message, reading the selected e-mail message, recording a reply to the selected e-mail message, producing an audio file, and sending the audio file as an attachment to a reply e-mail.

Further in accordance with a preferred embodiment of the present invention the audio file is a WAV file. Additionally or alternatively the audio file is a compressed WAV file.

Still further in accordance with a preferred embodiment of the present invention and also including the step of downloading an e-mail message from an e-mail server.

Additionally in accordance with a preferred embodiment of the present invention, the method also includes the step of forwarding the selected e-mail message to a pager. The method may also include the step of forwarding the selected e-mail message to a fax machine.

There is also provided in accordance with yet another preferred embodiment of the present invention a method for management of electronic mail, including the steps of converting an e-mail message from text to speech; receiving an input request for a selected e-mail message, reading the selected e-mail message, recording a reply to the selected e-mail message, producing an audio file, storing the audio file on a computer, and sending a reply e-mail containing a link to the audio file.

Further in accordance with a preferred embodiment of the present invention the audio file is a RealAudio file.

Still further in accordance with a preferred embodiment of the present invention the method also includes the step of downloading an e-mail message from an e-mail server.

Additionally the method further includes the step of forwarding the selected e-mail message to a pager. Additionally or alternatively the method also includes the step of forwarding the selected e-mail message to a fax machine.

There is also provided in accordance with another preferred embodiment of the present invention a system for management of electronic mail, including a text-to-speech converter converting an e-mail message from text to speech, a receiver receiving an input request for a selected e-mail message, an audio player reading the selected e-mail message, an audio recorder recording a reply to the selected e-mail message, producing an audio file, and a transmitter sending the audio file as an attachment to a reply e-mail.

Further in accordance with a preferred embodiment of the present invention the audio file is a WAV file. Preferably the audio file is a compressed WAV file.

Still further in accordance with a preferred embodiment of the present invention, the management system also includes a downloader downloading an e-mail message from an e-mail server.

Further in accordance with a preferred embodiment of the present invention, the management system also includes a mail forwarder forwarding the selected e-mail message to a pager.

Additionally or alternatively a mail forwarder forwarding the selected e-mail message to a fax machine is also included.

There is thus provided in accordance with a preferred embodiment of the present invention a system for management of electronic mail, including a text-to-speech converter converting an e-mail message from text to speech, a receiver receiving an input request for a selected e-mail message, an audio player reading the selected e-mail message, an audio recorder recording a reply to the selected e-mail message, producing an audio file, a computer storing the audio file, and a transmitter sending a reply e-mail containing a link to the audio file.

Further in accordance with a preferred embodiment of the present invention, the audio file is a RealAudio file.

Still further in accordance with a preferred embodiment of the present invention, the management system also includes a downloader downloading an e-mail message from an e-mail server.

Additionally in accordance with a preferred embodiment of the present invention and also including a mail forwarder forwarding the selected e-mail message to a pager. Additionally or alternatively the management system also includes a mail forwarder forwarding the selected e-mail message to a fax machine.

There is thus provided in accordance with yet another preferred embodiment of the present invention a method for managing voice electronic mail including the steps of playing by a local computer an incoming audio file containing a voice message, the incoming audio file residing on a remote computer, and saving the incoming audio file as a local audio file on the local computer after the playing step.

Further in accordance with a preferred embodiment of the present invention, the incoming audio file is a streaming audio file.

Still further in accordance with a preferred embodiment of the present invention the streaming audio file is a RealAudio file.

Preferably the local audio file is a WAV file. Additionally or alternatively the local audio file is a compressed WAV file.

Still further in accordance with a preferred embodiment of the present invention the local audio file is a RealAudio file.

There is further provided in accordance with yet another preferred embodiment of the present invention a method for management of electronic mail, including the steps of converting an e-mail message from text to speech, receiving an input request for a selected e-mail message, reading the selected e-mail message, recording a reply to the selected e-mail message, producing an audio file, sending the audio file as an attachment to a reply e-mail, and playing the audio file.

Further in accordance with a preferred embodiment of the present invention the audio file is a WAV file. Preferably the audio file is a compressed WAV file.

Additionally in accordance with a preferred embodiment of the present invention the playing step includes the step of decompressing the audio file.

There is also provided in accordance with yet another preferred embodiment of the present invention a method for management of electronic mail, including the steps of converting an e-mail message from text to speech, receiving an input request for a selected e-mail message, reading the selected e-mail message, recording a reply to the selected e-mail message, producing an audio file, storing the audio file on a first computer, sending a reply e-mail containing a link to the audio file, playing the audio file, and saving the audio file.

Further in accordance with a preferred embodiment of the present invention the audio file is a RealAudio file.

Still further in accordance with a preferred embodiment of the present invention the saving step includes the step of converting the audio file to a designated file format. Preferably the designated file format is a WAV format.

Moreover in accordance with a preferred embodiment of the present invention the designated file format is a compressed WAV format.

There is provided in accordance with yet another preferred embodiment of the present invention a system for managing voice electronic mail including an audio player within a local computer playing an incoming audio file containing a voice message, the incoming audio file residing on a remote computer, and a data processor saving the incoming audio file as a local audio file on the local computer, after the audio player plays the incoming audio file.

Further in accordance with a preferred embodiment of the present invention the incoming audio file is a streaming audio file.

Still further in accordance with a preferred embodiment of the present invention the streaming audio file is a RealAudio file.

Additionally in accordance with a preferred embodiment of the present invention the local audio file is a WAV file. Preferably the local audio file is a compressed WAV file.

Moreover in accordance with a preferred embodiment of the present invention the local audio file is a RealAudio file.

There is further provided in accordance with yet another preferred embodiment of the present invention a system for management of electronic mail, including a text-to-speech converter converting an e-mail message from text to speech, a receiver receiving an input request for a selected e-mail message, a first audio player reading the selected e-mail message, an audio recorder recording a reply to the selected e-mail message, producing an audio file, a transmitter sending the audio file as an attachment to a reply e-mail, and a second audio player playing the audio file.

Further in accordance with a preferred embodiment of the present invention the audio file is a WAV file. Preferably the audio file is a compressed WAV file.

Additionally the management system also includes a decompressor decompressing the audio file.

There is also provided in accordance with another preferred embodiment of the present invention a system for management of electronic mail, including a text-to-speech converter converting an e-mail message from text to speech, a receiver receiving an input request for a selected e-mail message, a first audio player reading the selected e-mail message, an audio recorder recording a reply to the selected e-mail message, producing an audio file, a computer storing the audio file, a transmitter sending a reply e-mail containing a link to the audio file, a second audio player playing the audio file, and a data processor saving the audio file.

Further in accordance with a preferred embodiment of the present invention the audio file is a RealAudio file.

Still further in accordance with a preferred embodiment of the present invention the data processor converts the audio file to a designated file format. Preferably the designated file format is a WAV format. Additionally the designated file format may be in a compressed WAV format.

There is further provided in accordance with yet another preferred embodiment of the a method for management of electronic mail, including the steps of converting an e-mail message from text to speech, receiving an input request for a selected e-mail message, reading the selected-mail containing a link to the audio file, recording a reply to the selected e-mail message, producing an audio file containing the recorded reply; sending the audio file to a computer, and sending a reply e-mail containing a link to the audio file.

Further in accordance with a preferred embodiment of the present invention the audio file is a RealAudio file.

Still further in accordance with a preferred embodiment of the present invention and also including the step of downloading an e-mail message from an e-mail server.

Additionally in accordance with a preferred embodiment of the present invention and also including the step of forwarding the selected e-mail message to a pager. Additionally or alternatively the step of forwarding the selected e-mail message may be forwarding the selected e-mail message to a fax machine.

There is further provided in accordance with yet another preferred embodiment of the present invention a system for management of electronic mail, including a text-to-speech converter converting an e-mail message from text to speech, a receiver receiving an input request for a selected e-mail message, an audio player reading the selected e-mail message, an audio recorder recording a reply to the selected e-mail message and producing an audio file containing the recorded reply, and a transmitter sending the audio file to a computer and sending a reply e-mail containing a link to the audio file.

Further in accordance with a preferred embodiment of the present invention the audio file is a RealAudio file.

Still further in accordance with a preferred embodiment of the present invention and also including a downloader downloading an e-mail message from an e-mail server.

Additionally in accordance with a preferred embodiment of the present invention further including a mail forwarder forwarding the selected e-mail message to a pager.

Moreover the preferred embodiment of the present invention may also include a mail forwarder forwarding the selected e-mail message to a fax machine.

There is also provided in accordance with a preferred embodiment of the present invention a method for management of electronic mail, including the steps of converting an e-mail message from text to speech, receiving an input request for a selected e-mail message, reading the selected e-mail message, recording a reply to the selected e-mail message, producing an audio file containing the recorded reply, sending the audio file to a computer, sending a reply e-mail containing a link to the audio file, playing the audio file, and saving the audio file.

Further in accordance with a preferred embodiment of the present invention the audio file is a RealAudio file.

Still further in accordance with a preferred embodiment of the present invention the saving step includes the step of converting the audio file to a designated file format.

Additionally in accordance with a preferred embodiment of the present invention the designated file format is a WAV format. Preferably the designated file format is a compressed WAV format.

There is further provided in accordance with yet another preferred embodiment of the present invention a system for management of electronic mail, including a text-to-speech converter converting an e-mail message from text to speech, a receiver receiving an input request for a selected e-mail message, a first audio player reading the selected e-mail message, an audio recorder recording a reply to the selected e-mail message, and producing an audio file containing the recorded reply, a transmitter sending the audio file to a computer and sending a reply e-mail containing a link to the audio file, a second audio player playing the audio file, and a data processor saving the audio file.

Further in accordance with a preferred embodiment of the present invention the audio file is a RealAudio file.

Still further in accordance with a preferred embodiment of the present invention the data processor converts the audio file to a designated file format. Preferably the designated file format is a WAV format. Additionally or alternatively the designated file format is a compressed WAV format.

There is thus provided in accordance with a preferred embodiment of the present invention a method for voice communication including the steps of providing a telephone network including a multiplicity of telephones interconnected by telephone network interconnections, providing a computer network having a multiplicity of nodes, enabling e-mail communication between the nodes, providing a multiplicity of voice response computers, each voice response computer being connected to a node of the computer network, and making each voice response computer actuable by an input received from one of the multiplicity of telephones via the telephone network for communicating voice received via the one of the multiplicity of telephones via e-mail over the computer network.

Further in accordance with a preferred embodiment of the present invention the method also includes the step of providing buddy functionality whereby communications are sent to user-selected buddies via the computer network.

Still further in accordance with a preferred embodiment of the present invention the method further includes the step of providing buddy functionality whereby communications are sent to user-selected buddies via the computer network indicating that a user is communicating using a user's telephone via the telephone network with a user's voice response computer.

Still further in accordance with a preferred embodiment of the present invention the method also includes the step of providing buddy functionality whereby communications are sent to user-selected buddies via the computer network indicating that a user has communicated voice via the telephone network and the computer network using a user's telephone and a user's voice response computer.

Additionally in accordance with a preferred embodiment of the present invention the voice response computers are operative to convert DTMF to a buddy communication protocol.

Moreover in accordance with a preferred embodiment of the present invention the voice response computers communicate with a database. Preferably the database is an SQL database.

Further in accordance with a preferred embodiment of the present invention the step of actuating at least one of the voice response computers by choosing an e-mail address of a recipient from a pre-defined directory. Additionally or alternatively the step of actuating at least one of the voice response computers by the entering an e-mail address of a recipient via DTMF codes.

Preferably the step of operating at least one of said voice response computers includes storing in a directory, e-mail addresses entered by a sender.

Still further in accordance with a preferred embodiment of the present invention the step of actuating at least one of the voice response computers by entering an e-mail address of a recipient via speech recognition by the at least one of the multiplicity of voice response computers.

There is further provided in accordance with yet another preferred embodiment of the present invention a method of voice communication including the steps of providing a telephone network including a multiplicity of telephones interconnected by telephone network interconnections, providing a computer network having a multiplicity of nodes, enabling e-mail communication between the nodes, providing a multiplicity of voice response computers, each voice response computer being connected to a node of the computer network, and making each voice response computer actuable by an input received from one of the multiplicity of voice response computers via the computer network for receiving voice communicated via e-mail over the computer network and providing a voice output to a telephone via the telephone network.

Further in accordance with a preferred embodiment of the present invention, the method also provides buddy functionality whereby communications are sent from user-selected buddies via the computer network.

Still further in accordance with a preferred embodiment of the present invention the method also provides buddy functionality whereby communications are sent from user-selected buddies via the computer network indicating that a user is communicating using a user's telephone via the telephone network with a user's voice response computer.

The method of voice communication also provides buddy functionality whereby communications are sent from user-selected buddies via the computer network indicating that a user has communicated voice via said telephone network and said computer network using a user's telephone and a user's voice response computer.

Still further in accordance with a preferred embodiment of the present invention the voice response computers are capable of sensing the presence of a link to an audio file in e-mail received thereat.

Additionally in accordance with a preferred embodiment of the present invention the voice response computers are capable of accessing said audio file via said link for playing said audio file to a recipient.

There is also provided in accordance with yet another preferred embodiment of the present invention a method of voice communication including the steps of providing a telephone network including a multiplicity of telephones interconnected by telephone network interconnections, providing a computer network having a multiplicity of nodes, enabling e-mail communication between the nodes, providing a multiplicity of voice response computers, each voice response computer being connected to a node of the computer network, making each voice response computer actuable by an input received from one of the multiplicity of telephones via the telephone network for communicating voice received via the one of the multiplicity of telephones via e-mail over the computer network, making each voice response computer also actuable by an input received from one of the multiplicity of voice response computers via the computer network for receiving voice communicated via e-mail over the computer network, and providing a voice output to a telephone via the telephone network.

Further in accordance with a preferred embodiment of the present invention also providing buddy functionality whereby communications are sent to user-selected buddies via the computer network.

Still further in accordance with a preferred embodiment of the present invention, the method also provides buddy functionality whereby communications are sent to user-selected buddies via the computer network indicating that a user is communicating using a user's telephone via the telephone network with a user's voice response computer.

Additionally in accordance with a preferred embodiment of the present invention and also providing buddy functionality whereby communications are sent to user-selected buddies via the computer network indicating that a user has communicated voice via the telephone network and the computer network using a user's telephone and a user's voice response computer.

There is further provided in accordance with a preferred embodiment of the present invention a method of voice communication including the steps of providing a telephone network including a multiplicity of telephones interconnected by telephone network interconnections, providing a computer network having a multiplicity of nodes, enabling e-mail communication between said nodes, connecting a multiplicity of voice response computers, each voice response computer to a node of the computer network, and making actuable at least one of the voice response computers by an input received from one of the multiplicity of telephones via the telephone network for communicating voice received via the one of the multiplicity of telephones via a non-streaming Internet protocol over the computer network.

Further in accordance with a preferred embodiment of the present invention, the method also provides buddy functionality whereby communications are sent to user-selected buddies via said computer network.

Still further in accordance with a preferred embodiment of the present invention also providing buddy functionality whereby communications are sent to user-selected buddies via the computer network indicating that a user is communicating using a user's telephone via the telephone network with a user's voice response computer.

Still further in accordance with a preferred embodiment of the present invention and also providing buddy functionality whereby communications are sent to user-selected buddies via the computer network indicating that a user has communicated voice via the telephone network and the computer network using a user's telephone and a user's voice response computer.

Additionally in accordance with a preferred embodiment of the present invention, the method also includes the step of operating the voice response computers to convert DTMF to a buddy communication protocol.

Moreover in accordance with a preferred embodiment of the present invention, the method further includes the step of actuating the multiplicity of voice response computers is by choosing an e-mail address of a recipient from a pre-defined directory.

Further in accordance with a preferred embodiment of the present invention, the method may also include the step of actuating the multiplicity of voice response computers by entering an e-mail address of a recipient via DTMF codes.

Further in accordance with a preferred embodiment of the present invention and including the step of operating the multiplicity of voice response computers to store in a directory, e-mail addresses entered by a sender.

Furthermore the method of voice communication may also include the step of actuating the multiplicity of voice response computers by the entering an e-mail address of a recipient via speech recognition by one of the multiplicity of voice response computers.

There is also provided in accordance with a preferred embodiment of the present invention a method of voice communication including the steps of providing a telephone network including a multiplicity of telephones interconnected by telephone network interconnections, providing a computer network having a multiplicity of nodes, enabling non-streaming Internet protocol communication between the nodes, connecting a multiplicity of voice response computers, each voice response computer to a node of the computer network, and actuating an input received from one of the multiplicity of voice response computers via the computer network for receiving voice communicated via a non-streaming internet protocol over the computer network and providing a voice output to a telephone via the telephone network.

Further in accordance with a preferred embodiment of the present invention and also providing buddy functionality whereby communications are sent from user-selected buddies via the computer network.

Still further in accordance with a preferred embodiment of the present invention, the method also provides buddy functionality whereby communications are sent from user-selected buddies via the computer network indicating that a user is communicating using a user's telephone via the telephone network with a user's voice response computer.

Additionally in accordance with a preferred embodiment of the present invention and also providing buddy functionality whereby communications are sent from user-selected buddies via the computer network indicating that a user has communicated voice via the telephone network and the computer network using a user's telephone and a user's voice response computer.

Moreover in accordance with a preferred embodiment of the present invention, the method also includes the step of being capable of sensing the presence of a link to an audio file in e-mail received thereat by the voice response computers, and wherein the voice response computers are also capable of accessing the audio file via the link for playing the audio file to a recipient.

Additionally the voice response computers may also be capable of sensing the presence of a link to an audio file in e-mail received thereat.

There is also provided in accordance with a preferred embodiment of the present invention a method of voice communication including the steps of: providing a telephone network including a multiplicity of telephones interconnected by telephone network interconnections, providing a computer network having a multiplicity of nodes, enabling e-mail communication between the nodes, connecting at least one voice response computer of a multiplicity of voice response computers to a node of the computer network, and actuating a voice response computer by an input received from one of the multiplicity of telephones via the telephone network for communicating voice received via the one of the multiplicity of telephones via a non-streaming Internet protocol over said computer network, each voice response computer also being actuable by an input received from one of the multiplicity of voice response computers via the computer network for receiving voice communicated via a non-streaming Internet protocol over the computer network and providing a voice output to a telephone via the telephone network.

Further in accordance with a preferred embodiment of the present invention, the method of voice communication also includes providing buddy functionality whereby communications are sent to user-selected buddies via the computer network.

Still further in accordance with a preferred embodiment of the present invention, the method of voice communication also includes providing buddy functionality whereby communications are sent to user-selected buddies via said computer network indicating that a user is communicating using a user's telephone via said telephone network with a user's voice response computer.

Additionally in accordance with a preferred embodiment of the present invention and also providing buddy functionality whereby communications are sent to user-selected buddies via said computer network indicating that a user has communicated voice via said telephone network and said computer network using a user's telephone and a user's voice response computer.

There is also provided in accordance with yet another preferred embodiment of the present invention, a method of voice communication including the steps of providing a cellular telephone network including a multiplicity of telephones interconnected by telephone network interconnections, providing a computer network having a multiplicity of nodes, enabling communication between the nodes, connecting at least one computer of a multiplicity of computers, to a node of the computer network, and actuating at least one of the computers by an input received from one of the multiplicity of telephones via the telephone network for communicating messages received via the one of the multiplicity of telephones via a telephone compatible Internet communication language over the computer network, at least one of senders or recipients of the messages being user-selected buddies.

There is thus provided in accordance with yet another preferred embodiment of the present invention a method of voice communication including the steps of providing a cellular telephone network including a multiplicity of telephones interconnected by telephone network interconnections, providing a computer network having a multiplicity of nodes, enabling communication between the nodes, connecting at least one computer of a multiplicity of computers to a node of the computer network, and actuating at least one of the computers by an input received from one of the multiplicity of voice response computers via the computer network for receiving messages communicated via a telephone compatible Internet communication language over the computer network and providing a telephone compatible Internet communication language output to a telephone via the telephone network, at least one of senders or recipients of the messages being user-selected buddies.

There is further provided in accordance with another preferred embodiment of the present invention a, a method of voice communication including the steps of a providing a cellular telephone network including a multiplicity of telephones interconnected by telephone network interconnections, providing a computer network having a multiplicity of nodes, enabling communication between the nodes, connecting at least one computer of a multiplicity of computers to a node of the computer network, and actuating at least one of the computers by an input received from one of the multiplicity of telephones via the telephone network for communicating messages received via the one of the multiplicity of telephones via a telephone compatible Internet communication language over the computer network, each computer also being actuable by an input received from one of the multiplicity of computers via the computer network for receiving messages communicated over the computer network and providing a telephone compatible Internet communication language output to a telephone via the telephone network, at least one of senders or recipients of the messages being user-selected buddies.

There is also provided in accordance with a preferred embodiment of the present invention, a method of voice communication for use with a computer network and including the steps of providing a recorder recording a sender's voice, providing a web server storing the sender's voice, and providing a notifier sending a notification to at least one recipient, the notification containing a link enabling retrieval of the sender's voice from the web server.

Further in accordance with a preferred embodiment of the present invention, the method includes the step of employing a telephone network in the recorder.

Still further in accordance with a preferred embodiment of the present invention, the method also includes the step of employing a microphone outputting to a computer in the recorder.

Additionally in accordance with a preferred embodiment of the present invention, and further including the step of storing the sender's voice together with the meta-information associated therewith in a single storage unit of the web server. Preferably, the method of voice communication also includes the step of spooling the sender's voice to a local storage facility in the recorder.

Additionally the method may also include the step of transmitting a sender's voice from a transmitter, and preferably also including the step of transmitting the sender's voice via HTTP PUT to the web server of the transmitter.

Furthermore the method of voice communication and may also include the step of spooling the sender's voice to an SMTP server of said transmitter.

Additionally the method may include the step of encoding a sender's voice in a compressed format in said transmitter.

Moreover in accordance to a preferred embodiment of the present invention the step of including an SMTP server in the web server.

Further in accordance with a preferred embodiment of the present invention also including the step of including an HTTP server enabled to handle PUT commands in said web server.

Still further in accordance with a preferred embodiment of the present invention and including the step of encoding the sender's voice in a streaming format in the web server.

Additionally in accordance with a preferred embodiment of the present invention and including the step of operating the web server to encode multiple senders' voices simultaneously.

Further in accordance with a preferred embodiment of the present invention and also including the step of including a functionality which associates user preferences with recorded user voice elements in the web server.

Moreover in accordance with a preferred embodiment of the present invention, the method includes the step of including the following functionalities: formatting the notification as a function of at least one parameter of the recipient and formatting the notification for a plurality of participants as a function of at least one parameter of each recipient.

Further in accordance with a preferred embodiment of the present invention, the method also includes the step of connecting said link to at least an advertising medium.

Still further in accordance with a preferred embodiment of the present invention and also including the step of connecting the link also connects to an audio file.

There is further provided in accordance with a preferred embodiment of the present invention a method of voice communication using a telephone network including a multiplicity of telephones interconnected by telephone network interconnections, a computer network having a multiplicity of nodes and enabling communication between the nodes, at least one web server connected to one of the multiplicity of nodes, and at least one voice response computer connected to one of the multiplicity of nodes, and including the steps of at least one of the multiplicity of telephones communicates data with said at least one web server using a telephone compatible Internet communication language, at least one of the multiplicity of telephones communicates voice with the at least one voice response computer, and at least one of the multiplicity of telephones communicates identification information to the at least one voice response computer, the identification information establishing a connection between the voice and the data.

There is also provided in accordance with yet another preferred embodiment of the present invention a method of voice communication using a telephone network including a multiplicity of telephones interconnected by telephone network interconnections, a computer network having a multiplicity of nodes and enabling communication between the nodes, at least one web server connected to one of the multiplicity of nodes, and at least one voice response computer connected to one of the multiplicity of nodes, and including the steps of at least one of the multiplicity of telephones communicates data with the at least one web server using a telephone compatible Internet communication language, at least one of the multiplicity of telephones communicates voice with the at least one voice response computer, at least one of the multiplicity of telephones communicates identification information to the at least one voice response computer, the identification information establishing a connection between the voice and the data, and the at least one voice response computer records the voice received from the at least one of the multiplicity of telephones.

There is further provided in accordance with yet another preferred embodiment of the present invention a method of voice communication using a telephone network including a multiplicity of telephones interconnected by telephone network interconnections, a computer network having a multiplicity of nodes and enabling communication between the nodes, at least one web server connected to one of the multiplicity of nodes, and at least one voice response computer connected to one of the multiplicity of nodes, and the method including the steps of at least one of the multiplicity of telephones communicates data with the at least one web server using a telephone compatible Internet communication language, at least one of the multiplicity of telephones communicates voice with the at least one voice response computer, and at least one of the multiplicity of telephones communicates identification information to the at least one voice response computer, the identification information establishing a connection between the voice and the data, the at least one voice response computer records said voice received from the at least one of the multiplicity of telephones and stores the voice on the web server, and a notification is sent to at least one recipient, the notification containing a link enabling retrieval of the voice from the web server.

There is further provided in accordance with another preferred embodiment of the present invention, a method of voice communication including the steps of providing a computer network having a multiplicity of nodes, enabling e-mail communication between the nodes, connecting at least one database to the computer network, and storing e-mail communications between the nodes.

Further in accordance with a preferred embodiment of the present invention, a method of voice communication and also including the step of connecting at least one voice response computer at a node of the computer network, the at least one voice response computer being capable of accessing the at least one database.

Still further in accordance with a preferred embodiment of the present invention and including the step of interposing at least one proxy interposed between the at least one voice response computer and the at least one database.

Additionally in accordance with a preferred embodiment of the present invention, each of the multiplicity of databases contains a plurality of mail tables, wherein each mail table has assigned thereto a limited number of users.

Further in accordance with a preferred embodiment of the present invention at least one of the multiplicity of databases includes a list of destination addresses.

Moreover in accordance with a preferred embodiment of the present invention the list comprises a multiplicity of lists of destination addresses. Preferably at least one of the multiplicity of databases includes a meta-list for indexing the multiplicity of lists.

BRIEF DESCRIPTION OF THE DRAWINGS

The present invention will be more fully understood and appreciated from the following detailed description, taken in conjunction with the drawings in which.

DETAILED DESCRIPTION OF A PREFERRED EMBODIMENT

Figure 1A:
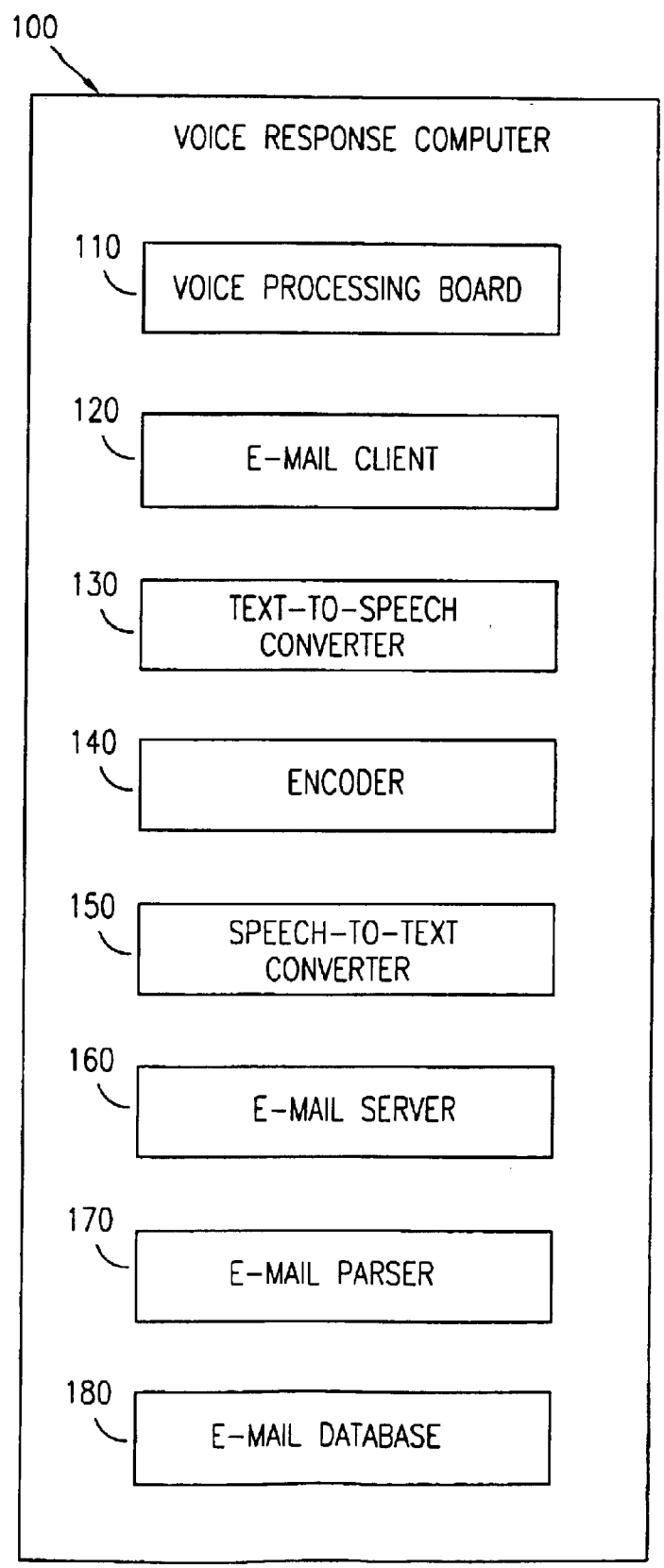
FIG. 1A is a simplified illustration of a voice response computer used for processing voice electronic mail in a preferred embodiment of the present invention.

The present specification describes a method and system for retrieving e-mail by dialing in from a telephone to a voice response unit. The e-mail is converted to speech and read to the user over the phone. Various selections can be made by pushing the buttons of the telephone, and the user can effectively scroll through his e-mail and choose the messages to listen to.

The present specification also describes a method and system for replying to e-mail through a telephone. The reply takes one or both of two forms: (1) a text e-mail reply, generated from the speech reply by a speech-to-text converter, and (2) an audio file that contains a recording of the speech reply therewithin. In one preferred embodiment of the present invention, the audio file is sent back to the original sender as a MIME attachment within a reply e-mail, in a standard audio format such as a WAV file.

When the original sender receives the reply e-mail, he can download the WAV file to his local computer and play the file to listen to the recorded reply. In another preferred embodiment the audio file is posted on an Internet web site in a streaming audio format such as REALAUDIO R, and a reply e-mail notification is sent to the original sender having an Internet link to the audio file therewithin. When the original sender receives the reply e-mail, he can click on the link to play the audio file. Streaming audio formats enable the user to play an audio file on-line, while it is being delivered, rather than have to wait until the entire audio file is downloaded. REALAUDIO is a registered trademark of Progressive Networks, Inc. Information about REALAUDIO files is available on the Internet at http://www.realaudio.com.

Advantages of the latter embodiment are (1) the e-mail reply is small in size, since it only contains a link to the audio file, rather than the file itself; and (2) the audio file is streamed for on-line playing. Advantages of the former embodiment are (1) the reply e-mail is self-contained, and the user does not have to use a web browser to listen to the voice reply; and (2) sensitive information is not being broadcast over the web. It should be pointed out that from an ergonometric point of view, both embodiments have the advantage that e-mail messages are being replied to with speech, and the replies are being listened to rather than read.

Dictating e-mail messages into a voice response unit over a telephone line is faster and simpler than typing a text message. For users who receive large volumes of e-mail on a daily basis, reading through e-mail is both time-consuming, and difficult on one's eyes. Many professionals spend hours daily reading and replying to e-mail messages. By listening to e-mail, rather than reading it, these professionals can work on other "vision-intensive" tasks while they are listening to their e-mail messages at the same time. This is analogous to working on a task while listening in on a conference call being played on the speaker of a telephone.

To assist in understanding the present invention, two simplified example sessions are described hereinbelow:

EXAMPLE SESSION I

A mobile user who wishes to send a message to an another person whose name appears on a predefined list of contacts, such as a company directory, dials up to a voice response unit (VRU). The VRU responds 1. EMAIL 2. PERSONAL DIRECTORY. 3. COMPANY DIRECTORY. The user selects 3 and the VRU responds PLEASE ENTER THE FIRST THREE LETTERS OF THE CONTACT'S NAME. The user enters via the telephone touch pad the first three letters. The VRU responds TO SEND AN EMAIL TO <CONTACT> PLEASE PRESS 1. The User enters 1. The VRU responds PLEASE RECORD YOUR VOICE AT THE TONE, PRESS # WHEN YOU ARE FINISHED. The User records his voice and presses # to terminate the recording session.

The VRU then reads a second menu of options as follows: 1. ATTACH SPEECH REPLY AS A WAV FILE ATTACHMENT TO E-MAIL REPLY 2. POST SPEECH REPLY AS A REALAUDIO FILE AND A WAV FILE AND SEND NOTIFICATION WITH LINKS. Selecting option 1 instructs the VRU to attach the WAV file to an e-mail reply. Selecting option 2 instructs the VRU to (1) convert the WAV file to a REALAUDIO file, (2) to post both a WAV file and a REALAUDIO file on an Internet web site, and (3) to send a notification reply e-mail containing two links—one link to the WAV file and one link to the REALAUDIO file.

EXAMPLE SESSION II

A mobile user dials in to a voice response unit (VRU) by means of a telephone to access his e-mail remotely. The VRU reads out a message indicating that the user has e-mail in his inbox. Each e-mail item contains a unique identifier, data fields including FROM, RE and DATE, a text body, and one or more attachments. Each e-mail message is converted from text to speech by a text-to-speech converter within the VRU. The VRU reads out a first menu of options as follows:

1. ID:018, FROM:ANDY, RE:MEETING TOMORROW, DATE:mm/dd/yy 2. ID:004, FROM:BILL, RE:SUNDAY PICNIC, DATE:mm/dd/yy 3. ID:103, FROM:CHARLIE, RE:UPCOMING EXAM, DATE:mm/dd/yy 4. ID:075, FROM:DAN, RE:DOCTOR'S APPOINTMENT, DATE:mm/dd/yy 5. <MORE>. Option 5, "<MORE>", is used for menus that entail more information than is presented in a single list. By selecting "<MORE>", the user requests additional lists of menu items. Correspondingly, successive lists could have a "<BACK>" option for returning to previous lists.

After listening to a specific e-mail message, the user can reply to the message and/or route the message to his fax machine or to his pager. For reply purposes, the user speaks into his telephone and the VRU records the speech as a WAV file. The VRU then reads a second menu of options as follows: 1. ATTACH SPEECH REPLY AS A WAV FILE ATTACHMENT TO E-MAIL REPLY 2. POST SPEECH REPLY AS A REALAUDIO FILE AND A WAV FILE AND SEND NOTIFICATION WITH LINKS. Selecting option 1 instructs the VRU to attach the WAV file to an e-mail reply. Selecting option 2 instructs the VRU to (1) convert the WAV file to a REALAUDIO file, (2) to post both a WAV file and a REALAUDIO file on an Internet web site, and (3) to send a notification reply e-mail containing two links—one link to the WAV file and one link to the REALAUDIO file.

In this case, the receiver has a choice of whether to download the WAV file to his local computer, or to stream it for on-line playing. In an alternative embodiment of the present invention, a choice between attaching a WAV file in a reply e-mail or posting a REALAUDIO file and a WAV file on an Internet site can be pre-programmed, thus avoiding the need for the second menu of options hereinabove. The pre-programmed choice of attach vs. post can be customized for each reply address.

Similarly, in another alternative embodiment of the present invention, when posting his reply on an Internet web site, the user can be given the choice of whether to post a WAV file or a REALAUDIO file, or both. For routing purposes, the VRU reads a third menu of options as follows: 1. FAX E-MAIL TO ME. 2. FAX E-MAIL ATTACHMENT (S) TO ME. 3. SEND TEXT ONLY TO MY PAGER. 4. <MORE>. Selecting option 1 instructs the VRU to fax e-mail, without attachments, to the user's fax machine. Selecting option 2 instructs the VRU to fax the e-mail attachment(s) to the user's fax machine. Selecting option 3 instructs the VRU to send the text body of the e-mail to the user's pager.

Reference is now made to FIG. 1A, which illustrates a voice response computer 100 used for processing voice electronic mail in a preferred embodiment of the present invention. Voice response computer 100 may include several components, as follows: A voice processing board 110 is used for processing incoming and outgoing voice messages. An example of such a board is the Dialogic D/21H board for Windows, a description of which is available at: http://www.dialogic.com. An e-mail client 120 is used for pulling incoming e-mail messages from local or remote e-mail servers, and for sending outgoing e-mail messages to local or remote e-mail servers. A text-to-speech converter 130 is used for converting text messages into voice messages.

Use of text-to-speech converter 130 is now described. Each e-mail message may be converted from text to speech by means of text-to-speech converter 130 (FIG. 1A). In a preferred embodiment, the present invention uses Microsoft's SAPI (Speech Application Programming Interface) version 4.0 toolkit for carrying out text-to-speech conversion. SAPI can be used with two well-known algorithms for text-to-speech conversion: Whistler, and Lernout & Hauspie. Reference information for Microsoft's SAPI 4.0 is available on-line via the Internet at Microsoft's web site http://www.Microsoft.com/iit/onlinedocs/intro2sapi.html, and reference information on Lernout & Hauspie is available on the Internet at http://www.lhs.com. Other text-to-speech toolkits, such as the AcuVoice toolkit of Fonix Corp., are available and can be used instead of a Microsoft toolkit. Reference information on AcuVoice is available on the Internet at http://acuvoice.com.

Text-to-speech converter 130 (FIG. 1A) stores the resultant speech data in an audio file, such as a WAV file. WAV is a standard file format for audio files. Three common types of WAV files are PCM (pulse code modulation audio), which is used on compact disks (CDs), (2) mLaw compressed audio, and (3) Interactive Multimedia Association ADPCM (adaptive differential pulse code modulation) compressed audio.

In a preferred embodiment the present invention uses a raw uncompressed audio format such as PCM, with single channel audio sampled at 11 KHz with 8 bits per sample. Single channel audio 11 KHz with 8 bits per sample are standard sampling parameters for speech.

An encoder 140 is used to compress WAV and other audio files. Use of encoder 140 is described more fully with reference to FIG. 3 below. A speech-to-text converter is used for converting voice messages into text messages. Use of speech-to-text converter 150 is described more fully with reference to FIG. 5 below. An e-mail server 160 is used as a local intermediate mail server for outgoing mail from voice response computer 100. Use of e-mail server 160 is described more fully with reference to FIGS. 2A & 2B below.

E-mail parser 170 is used for two purposes: (1) extracting messages and other fields from e-mail, and (2) breaking text into granular units such as sentences for managing threads that process text-to-speech tasks. Use of e-mail parser 170 is described more fully with reference to FIG. 7 below. An e-mail database 180 is used for storing e-mail for users of a voice response system. Use of e-mail database 180 is described more fully with reference to FIGS. 1A & 1B below.

It will be appreciated by those skilled in the art upon reading the ensuing description that the present invention does not require use of all of the abovementioned components. Specifically, the first components, voice processing board 110 is required. The remaining seven components: e-mail client 120, text-to-speech converter 130, encoder 140, speech-to-text converter 150, e-mail server 160, e-mail parser 170 and e-mail database 180 are not required, but serve to provide additional functionality and enhancements as described hereinbelow.

Figure 1B:
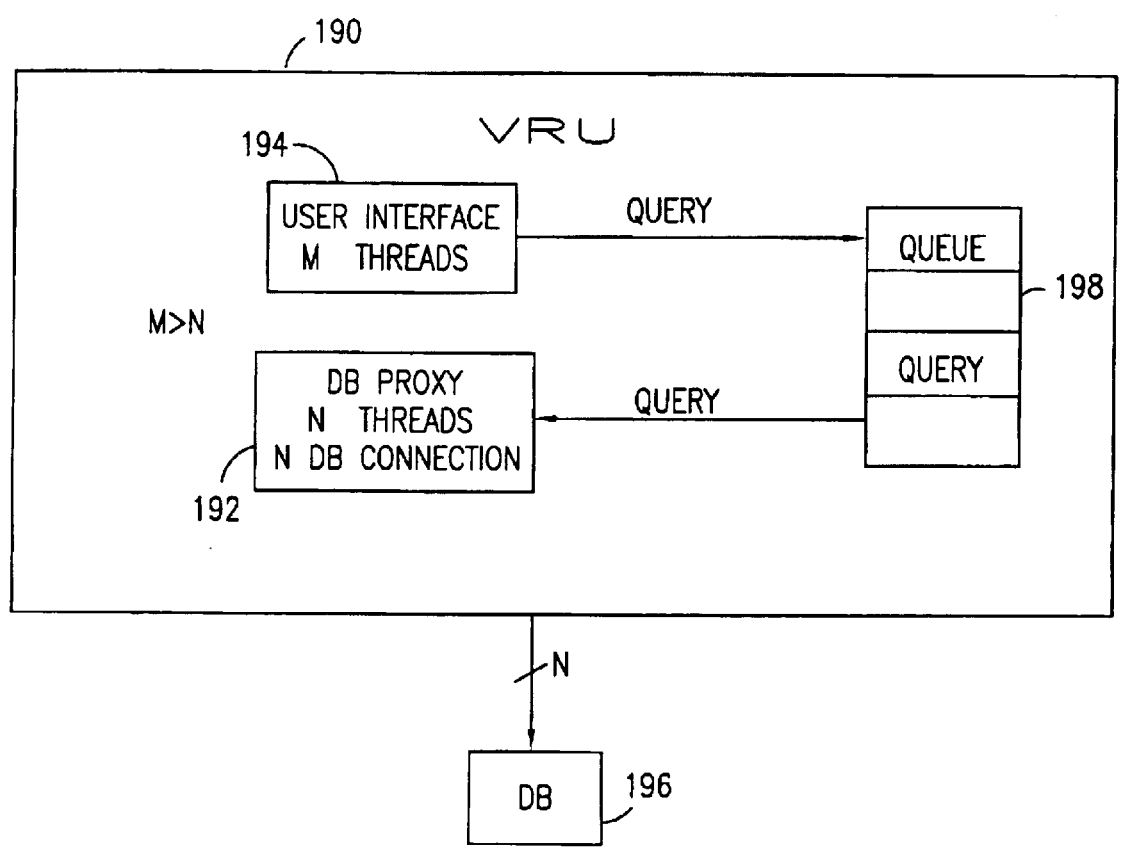
FIG. 1B is an illustration of the use of a voice response computer for accessing e-mail on an e-mail database.

Reference is now made to FIG. 1B, which illustrates a method for accessing e-mail on an e-mail database using a voice response computer. A voice response computer 190 preferably includes a database proxy 192, which includes N threads and N persistent database connections, which manage these connections.

The voice response computer 190 also preferably includes a user interface 194 having M threads, where M>N.

When a thread of user interface 194 seeks to query a database 196, the query is queued on a queue 198 and the database proxy 192 is notified accordingly. The database proxy 192 removes the query from queue 198 and assigns it to one of its N threads. Should more than N queries be received, they are queued until one of the N database proxy threads are available.

The functionality of FIG. 1B is particularly useful when M is very large, inasmuch as it is difficult to retain M persistent database connections.

Figure 2A:
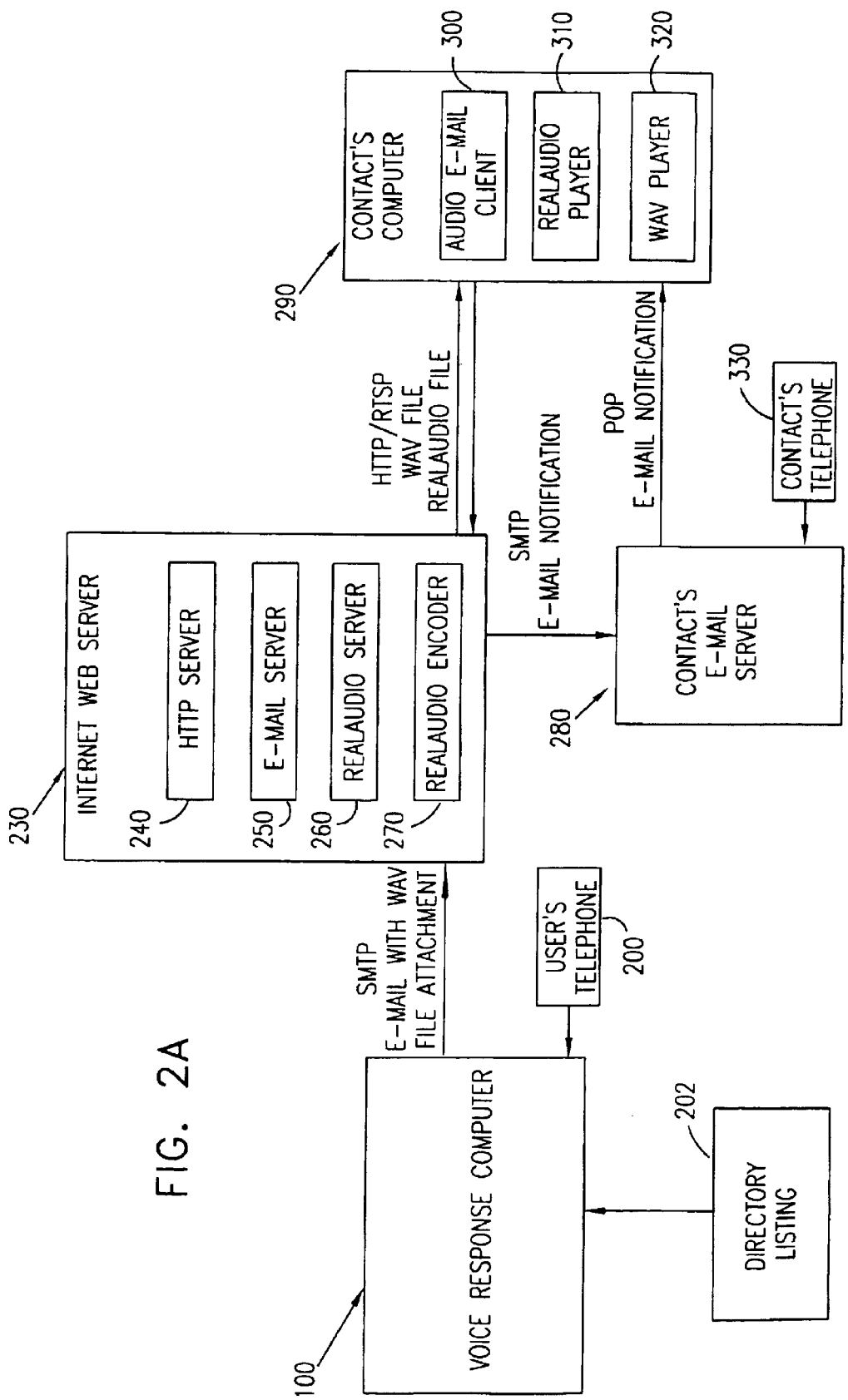
FIGS. 2A and 2B are simplified illustrations of an e-mail management system that posts a recorded message as an audio file and posts a reply message as an audio file on an Internet web site, in accordance with a preferred embodiment of the present invention, FIG. 2A representing the functionality of posting a recorded message as an audio file and FIG. 2B representing the functionality of posting a reply message as an audio file.
Figure 2B:
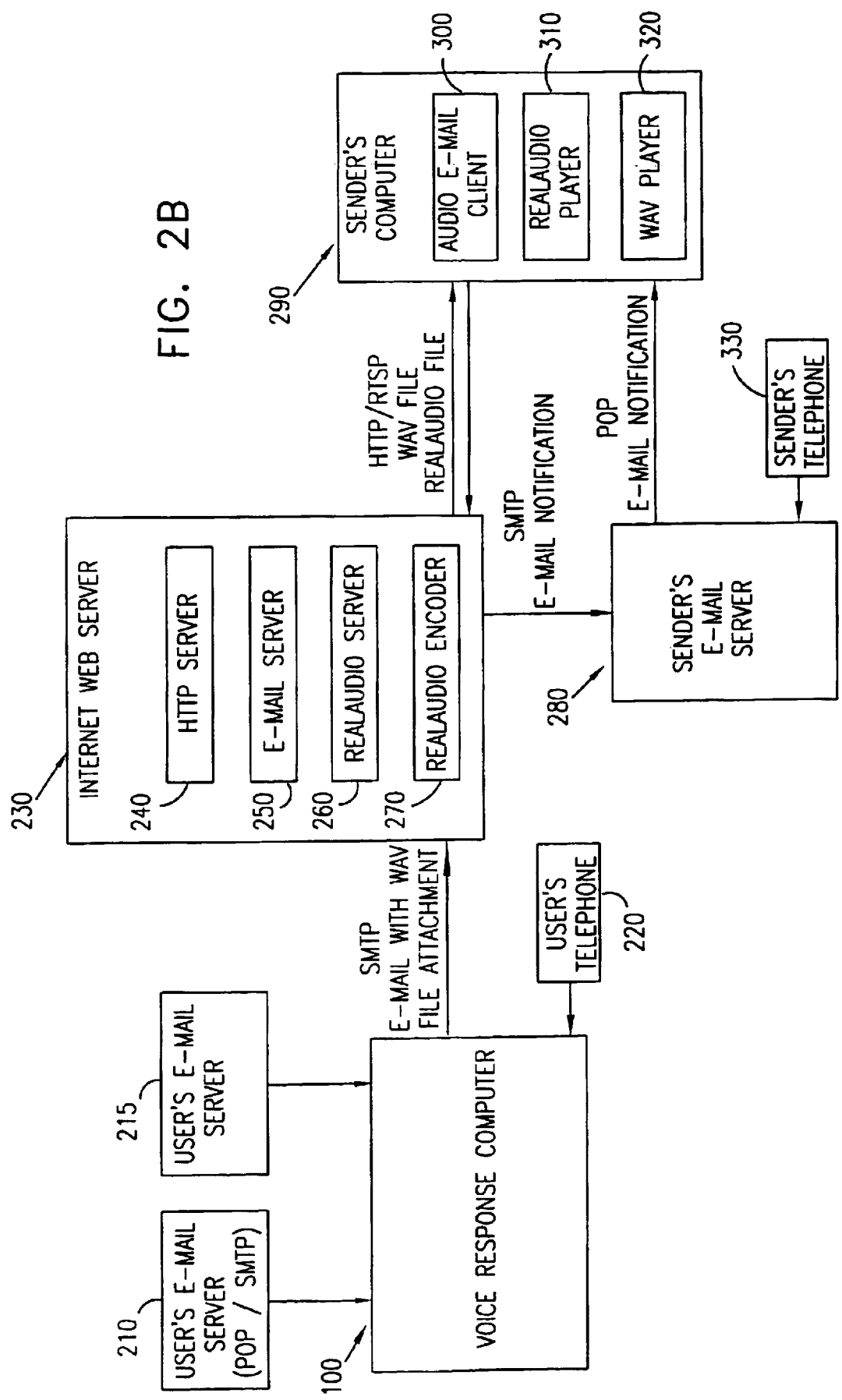

Reference is now made to FIGS. 2A and 2B, which are simplified illustrations of an e-mail management system that posts a recorded message as an audio file and posts a reply message as an audio file on an Internet web site, in accordance with a preferred embodiment of the present invention, FIG. 2A representing the functionality of posting a recorded message as an audio file and FIG. 2B representing the functionality of posting a reply message as an audio file.

It is appreciated that FIGS. 2A and 2B show essentially a single system that has two functionalities. It is appreciated that the present invention is not limited to a system having both functionalities but extends as well to systems having only one of the two functionalities.

Reference is now made specifically to FIG. 2A, which illustrates a message management system that posts a recorded message as an audio file on an Internet web site, in accordance with a preferred embodiment of the present invention.

The user, employing a telephone 200, dials in to the voice response computer 100 (FIG. 1A) and selects a contact from his directory listing 202. The user then records a message into the voice response computer 100. The user then informs voice response computer 100, by means of the telephone pad, that he wishes to convert the recorded message into a streaming audio format, such as a REALAUDIO format, and to post it on an Internet web server 230. Internet web server 230 preferably contains an HTTP server 240, an e-mail server 250 and a REALAUDIO server 260.

In response to the user's instruction, voice response computer 100 sends an outgoing e-mail containing a WAV file attachment, to e-mail server 250, using the SMTP protocol. Upon receiving the e-mail containing the WAV file attachment, Internet web server 230 extracts the WAV file. If the user instructed voice response computer 100 to post WAV and REALAUDIO files, then Internet web server 230 converts the extracted WAV file into a REALAUDIO file, by means of REALAUDIO encoder 270 contained therewithin, and posts both files (the WAV file and the REALAUDIO file) on an Internet web site.

Internet web server 230 then sends an outgoing notification, typically in the form of an e-mail, to the contact, via the contact's e-mail server 280, using the SMTP protocol. As an alternative to an e-mail notification, the present invention may employ an alternative type of notification, such as a notification which employs POTs telephone voice messaging, a beeper, an AOL Interactive Messaging (AIM) client or an ICQ client. For the sake of simplicity and conciseness, reference is made hereinbelow only to e-mail notifications, notwithstanding that the invention is not limited thereto.

The notification e-mail contains links to the REALAUDIO file and to the WAV file. Internet web server 230 is better suited for sending the notification e-mail than is voice response computer 100, since the Internet web server knows precisely when the REALAUDIO file and the WAV are posted and available for remote access.

In order to send the outgoing e-mail containing the WAV file attachment from voice response computer 100 to e-mail server 250, it is only necessary for voice response computer 100 to use e-mail client 120 (FIG. 1A). However, in a preferred embodiment of the present invention, voice response computer 100 also contains its own local e-mail server 160 (FIG. 1A). The outgoing e-mail containing the WAV file attachment is sent by voice response computer 100 to local e-mail server 160. E-mail server 160 then sends the e-mail containing the WAV file to e-mail server 250.

The advantage of using a local e-mail 160 server within voice response computer 100 is the time saving in waiting for an acknowledgment from the e-mail server receiving the e-mail. When an e-mail client sends e-mail, it must wait for an acknowledgment from an e-mail server. When e-mail contains a large attachment, such as a WAV file, there is a significant delay in waiting for the acknowledgment, due to bandwidth limitations of transmission over the Internet.

The system of FIG. 2A regularly sends e-mail messages with large WAV file attachments, and were the e-mail client required to wait for an acknowledgment each time a reply e-mail is sent, the latency of the system would be prolonged. When an e-mail message is sent to a local e-mail server, an acknowledgment is received almost immediately. Thus by sending the e-mail containing the WAV file attachment to its own local e-mail server 160 (FIG. 1A), voice response computer 100 achieves better throughput and performance.

From the contact's e-mail server 280, the notification e-mail is retrieved by an e-mail client on the contact's local computer 290, as an incoming e-mail, typically using the POP protocol. As described hereinbelow, the e-mail client resident in the contact's computer 290 may be an audio e-mail client 300 of the present invention. Upon receiving the notification e-mail, the contact clicks on a link contained in the notification e-mail to access the WAV file or the REALAUDIO file, using the HTTP protocol.

The contact's computer 290 contains a REALAUDIO player 310 for playing REALAUDIO files, and a WAV player 320 for playing WAV files. It may be the case that the contact is also a subscriber to the system of the present invention, as is the user. In this case the contact can also call in to server 280, by means of telephone 330, to retrieve his e-mail.

For simplicity, it is assumed in FIG. 2A that the contact's e-mail server 280 also functions as a voice response computer similar to voice response computer 100. Otherwise, the contact calls in to the contact's voice response computer (not shown) that pulls the contact's e-mail from e-mail server 280. In a preferred embodiment of the present invention, the contact's voice response computer (not shown) has the capability to automatically download audio files linked to a reply e-mail, and to play the audio files to the contact.

In this embodiment, when a notification e-mail with a link to an audio WAV file arrives at the contact's e-mail server 280, and is thereafter received by the contact's voice response computer (not shown), the contact's voice response computer automatically downloads the WAV file linked to the reply e-mail and plays it to the contact when he dials in.

It can thus be appreciated that the contact who is also a subscriber to the system of the present invention does not need to download the WAV file from the Internet himself, and can listen to the contents of the WAV file simply by dialing in to his voice response computer. In a preferred embodiment of the present invention, voice response computer 100 contains its own e-mail database 180 (FIG. 1A) for storing the user's e-mail. E-mail database 180 provides a structured directory-type facility for storing voice electronic mail. The user can save and organize his voice electronic mail into individual "mailboxes," for future access.

Reference is now made to FIG. 2B, which illustrates an e-mail management system that posts a reply message as an audio file on an Internet web site, in accordance with a preferred embodiment of the present invention. Elements in FIG. 2B, which are identical to those in FIG. 2A are identified by the same reference numerals.

In the discussion of FIGS. 2B–7 that follows, it is being assumed that a "user" receives an e-mail message from a "sender," and generates a speech reply. The term "user" is indicative of the fact that the user under discussion is a subscriber to the system of the present invention.

There exist two alternative methods for providing e-mail to e-mail database 180, namely a pull method and a push method. These two methods may operate concurrently.

According to a first method, which is a pull method, e-mail client 120 (FIG. 1A) polls e-mail server 210 on a regular basis (for example, every ten minutes) to determine the contents of the user's current inbox of e-mail, and to synchronize the e-mail items in e-mail database 180 of voice response computer 100 with the e-mail items in server 210.

Specifically, voice response computer 100 pulls newly arrived e-mail that has not yet been downloaded from e-mail server 210 and places it in e-mail database 180 and purges from e-mails database 180 old e-mail, that has not been stored by the user in a mailbox for archiving. As described hereinbelow, e-mail database 180 (FIG. 1A) may be used to store and control the e-mail items in voice response computer 100.

According to a second method, which is a push method, an e-mail server 215, upon receiving an e-mail for a user, inserts the e-mail directly into e-mail database 180.

In a preferred embodiment of the present invention, the user dials in to voice response computer 100 from telephone 220 to retrieve his e-mail from e-mail database 180. By pressing on the telephone pad in accordance with menu options read from the VRU, as illustrated in Example Session II, the user selects e-mail messages to be read to him by voice response computer 100.

After listening to an e-mail message, the user dictates a reply into the telephone, and voice response computer 100 records the reply. The user then informs voice response computer 100, by means of the telephone pad, that he wishes to convert the recorded reply into a streaming audio format, such as a REALAUDIO format, and to post it on an Internet web server 230. Internet web server 230 contains an HTTP server 240, an e-mail server 250 and a REALAUDIO server 260. As described hereinbelow, e-mail server 210 and e-mail server 250 may be the same e-mail server.

In response to the user's instruction, voice response computer 100 sends an outgoing reply e-mail containing a WAV file attachment to e-mail server 250, using the SMTP protocol. Upon receiving the reply e-mail containing the WAV file attachment, Internet web server 230 extracts the WAV file. If the user instructed voice response computer 100 to post WAV and REALAUDIO files, then Internet web server 230 converts the extracted WAV file into a REALAUDIO file, by means of REALAUDIO encoder 270 contained therewithin, and posts both files (the WAV file and the REALAUDIO file) on an Internet web site.

Internet web server 230 then sends an outgoing notification e-mail to the sender, via a sender's e-mail server 280, using the SMTP protocol. The notification e-mail contains links to the REALAUDIO file and to the WAV file. Internet web server 230 is better suited for sending the notification e-mail than is voice response computer 100 or e-mail server 210, since Internet web server knows precisely when the REALAUDIO file and the WAV file are posted and available for remote access.

In order to send the outgoing reply e-mail containing the WAV file attachment from voice response computer 100 to e-mail server 250, it is only necessary for voice response computer 100 to use e-mail client 120 (FIG. 1A). However, in a preferred embodiment of the present invention, voice response computer 100 also contains its own local e-mail server 160 (FIG. 1A). The outgoing reply e-mail containing the WAV file attachment is sent by voice response computer 100 to local e-mail server 160. E-mail server 160 then sends the reply e-mail containing the WAV file to e-mail server 250.

The advantage of using a local e-mail server 160 within voice response computer 100 is the time saving in waiting for an acknowledgment from the e-mail server receiving the e-mail. When an e-mail client sends e-mail, it must wait for an acknowledgment from an e-mail server. When e-mail contains a large attachment, such as a WAV file, there is a significant delay in waiting for the acknowledgment, due to bandwidth limitations of transmission over the Internet.

The system illustrated in FIG. 2B regularly sends e-mail replies with large WAV file attachments, and were the e-mail client required to wait for an acknowledgment each time a reply e-mail is sent, the latency of the system would be prolonged. When an e-mail reply is sent to the local e-mail server 160, an acknowledgment is received almost immediately. Thus by sending the reply e-mail containing the WAV file attachment to its own local e-mail server 160 (FIG. 1A), voice response computer 100 achieves better throughput and performance.

From the sender's e-mail server 280, the notification e-mail is retrieved by an e-mail client on the sender's local computer 290, as an incoming e-mail, using the POP protocol. As described hereinbelow, the e-mail client resident in the sender's computer 290 may be an audio e-mail client 300 of the present invention. Upon receiving the notification e-mail, the sender clicks on a link contained in the notification e-mail to access the WAV file or the REALAUDIO file, using the HTTP protocol.

The sender's computer 290 contains a REALAUDIO player 310 for playing REALAUDIO files, and a WAV player 320 for playing WAV files. It may be the case that the sender is also a subscriber to the system of the present invention, as is the user. In this case the sender can also call in to server 280, by means of telephone 330, to retrieve his e-mail.

For simplicity, it is assumed in FIG. 2B that the sender's e-mail server 280 also functions as a voice response computer similar to voice response computer 100. Otherwise, the sender calls in to a voice response computer (not shown) that pulls the sender's e-mail from e-mail server 280. In a preferred embodiment of the present invention, the sender's voice response computer (not shown) has the capability to automatically download audio files linked to a reply e-mail, and to play the audio files to the sender.

In this embodiment, when a notification e-mail with a link to an audio WAV file arrives at the sender's e-mail server 280, and is thereafter received by the sender's voice response computer, the sender's voice response computer automatically downloads the WAV file linked to the reply e-mail and plays it to the sender when he dials in.

It can thus be appreciated that the sender who is also a subscriber to the system of the present invention does not need to download the WAV file from the Internet himself, and can listen to the contents of the WAV file simply by dialing in to his voice response computer. In a preferred embodiment of the present invention, voice response computer 100 contains its own e-mail database 180 (FIG. 1A) for storing the user's e-mail. E-mail database 180 provides a structured directory-type facility for storing voice electronic mail. The user can save and organize his voice electronic mail into individual "mailboxes," for future access.

E-mail database 180 is updated whenever e-mail client 120 (FIG. 1A) polls e-mail server 210 for the user's e-mail. When new e-mail has arrived at e-mail server 210, e-mail client 120 downloads it to voice response computer 100, and adds it to database 180. When old e-mail is removed from e-mail server 210, voice response computer 100 removes its copy of such old e-mail from database 180, if the old e-mail has not been stored by the user in a mailbox. In this way, database 180 maintains synchronization with e-mail server 210. Database 180 can be an SQL database with fields such as sender, subject and date. Voice response computer 100 can carry out user requests for searches within database 180. For example, a user may want to access the e-mail that was sent from a designated sender within a designated time period.

Figure 3:
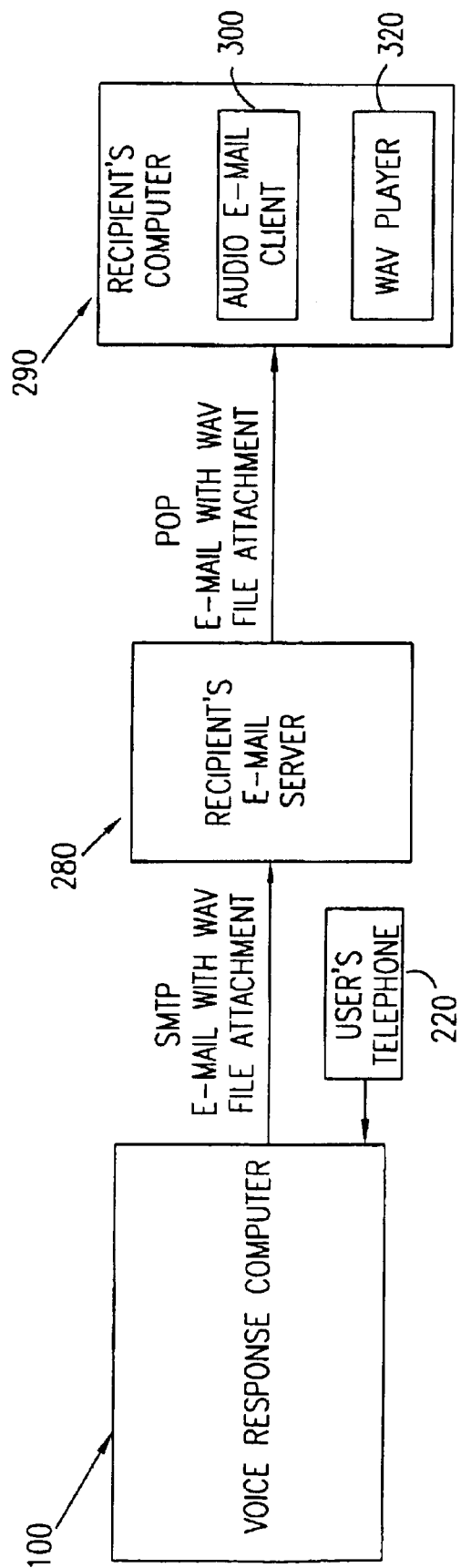
FIG. 3 is a simplified illustration of an e-mail management system that sends an audio file attachment to a reply e-mail, in accordance with a preferred embodiment of the present invention.

Reference is now made to FIG. 3, which illustrates an e-mail management system that sends an audio file attachment to an e-mail, such as a reply e-mail, in accordance with a preferred embodiment of the present invention. As above, the user dials in to voice response computer 100 from telephone 220 and dictates an e-mail to a recipient. The e-mail may or may not be a reply e-mail and the recipient may or may not be the sender of an e-mail to which a reply is being sent.

In the embodiment depicted in FIG. 3, the user informs voice response computer 100 that he desires to convert his recorded message, such as a reply, into an audio file, such as a WAV file, and to send it to an e-mail server 280 of a recipient, such as the sender, as an attachment to an e-mail, such as a reply e-mail. As described hereinabove with reference to FIGS. 2A & 2B, in a preferred embodiment of the present invention voice response system 100 sends the e-mail containing the WAV file attachment to its own local e-mail server 160 (FIG. 1A), and then e-mail server 160 sends it to e-mail server 280. This reduces network latency caused by the delay in waiting for an acknowledgment from a remote e-mail server.

The recipient's computer 290 pulls the e-mail as an incoming message from the recipient's e-mail server 280, typically using the POP protocol. By clicking on the reference to the WAV file attachment in the e-mail, the recipient can either save the file to his local disk, or play it using WAV player 320, or both. In an alternative embodiment of the present invention the audio file attached to a e-mail can be compressed as a self-extracting compressed file. Self-extracting files contain decompressors therewithin.

The recipient of an e-mail message with a self-extracting file attached therewithin can click on the reference to the file, and the compressed audio file automatically decompresses itself. For example, the present invention can attach a zipped WAV file to an e-mail. The attachment automatically unzips itself and regenerates the WAV file when a recipient clicks on the reference to the attachment. It is for the purpose of this alternative embodiment that voice response computer 100 contains encoder 140 (FIG. 1A) for compressing audio files.

Figure 4:
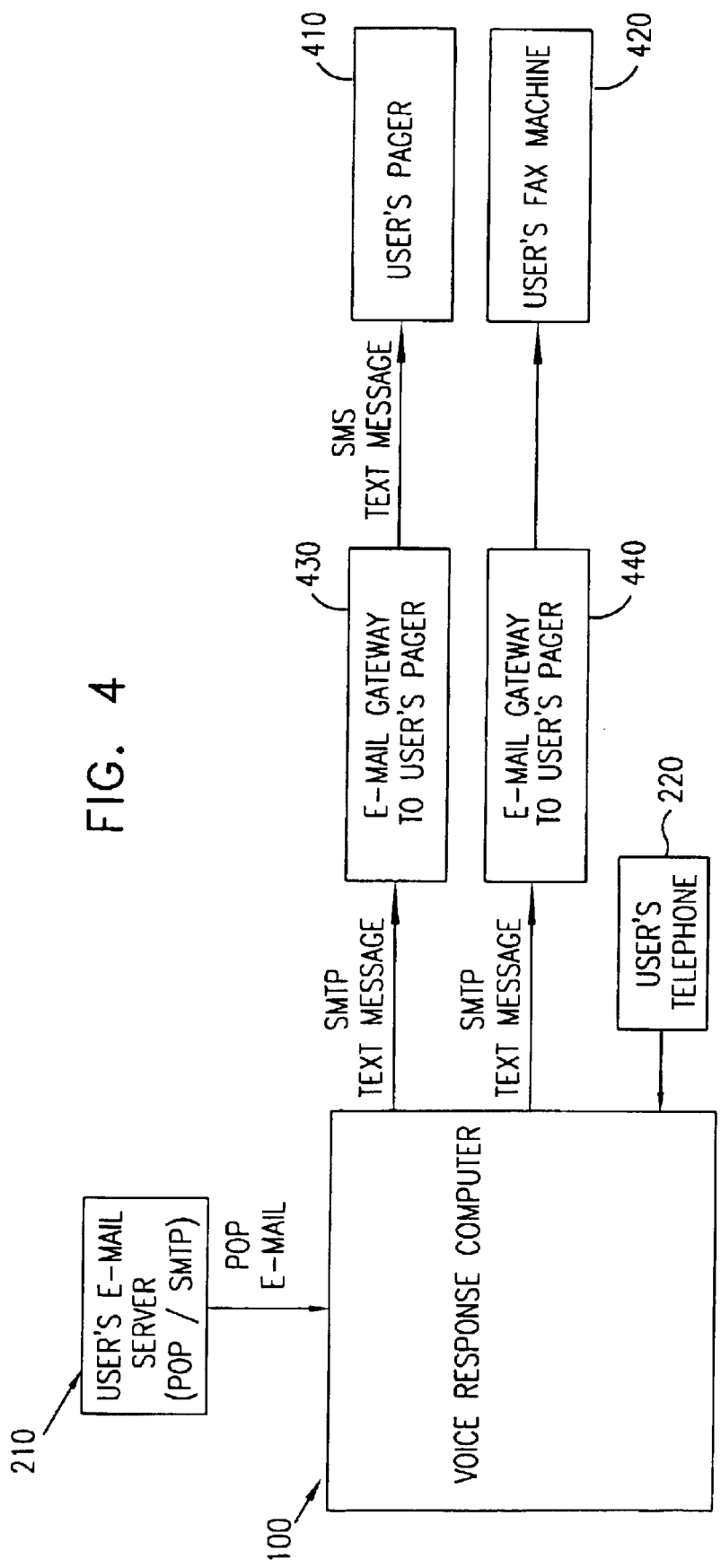
FIG. 4 is a simplified illustration of how a user can route his e-mail to a pager and/or a fax machine, in accordance with a preferred embodiment of the present invention.

Reference is now made to FIG. 4, which illustrates how a user can route his e-mail to a pager and/or a fax machine, in accordance with a preferred embodiment of the present invention. The user can instruct voice response computer 100, from telephone 220, to route his incoming e-mail message by sending it as a text message to his pager 410, or to his fax machine 420, or to both pager 410 and fax machine 420.

If the user elects to route his e-mail to pager 410, voice response computer 100 typically sends an outgoing e-mail message to e-mail gateway 430, using the SMTP protocol. Gateway 430 operates by accepting e-mail as input and producing a message that can be delivered to a pager as output. Specifically, the Simple Messaging System (SMS) protocol is designed as a protocol for transferring text data to a thin wireless data terminal, such as a pager. E-mail gateway 430 converts the user's text e-mail into a form suitable for wireless transmission to pager 410. Alternatively, voice response computer 100 can communicate in the SMS protocol directly with pager 410.

If the user elects to route his e-mail to fax machine 420, voice response computer 100 typically sands an outgoing e-mail message to e-mail gateway 440, using the SMTP protocol. Gateway 440 operates by accepting e-mail as input and producing a message that can be transmitted to a fax machine as output. As such, e-mail gateway 440 converts the user's text e-mail into a form suitable for transmission to fax machine 420. Alternatively, voice response computer 100 can communicate directly with fax machine 420.

Figure 5:
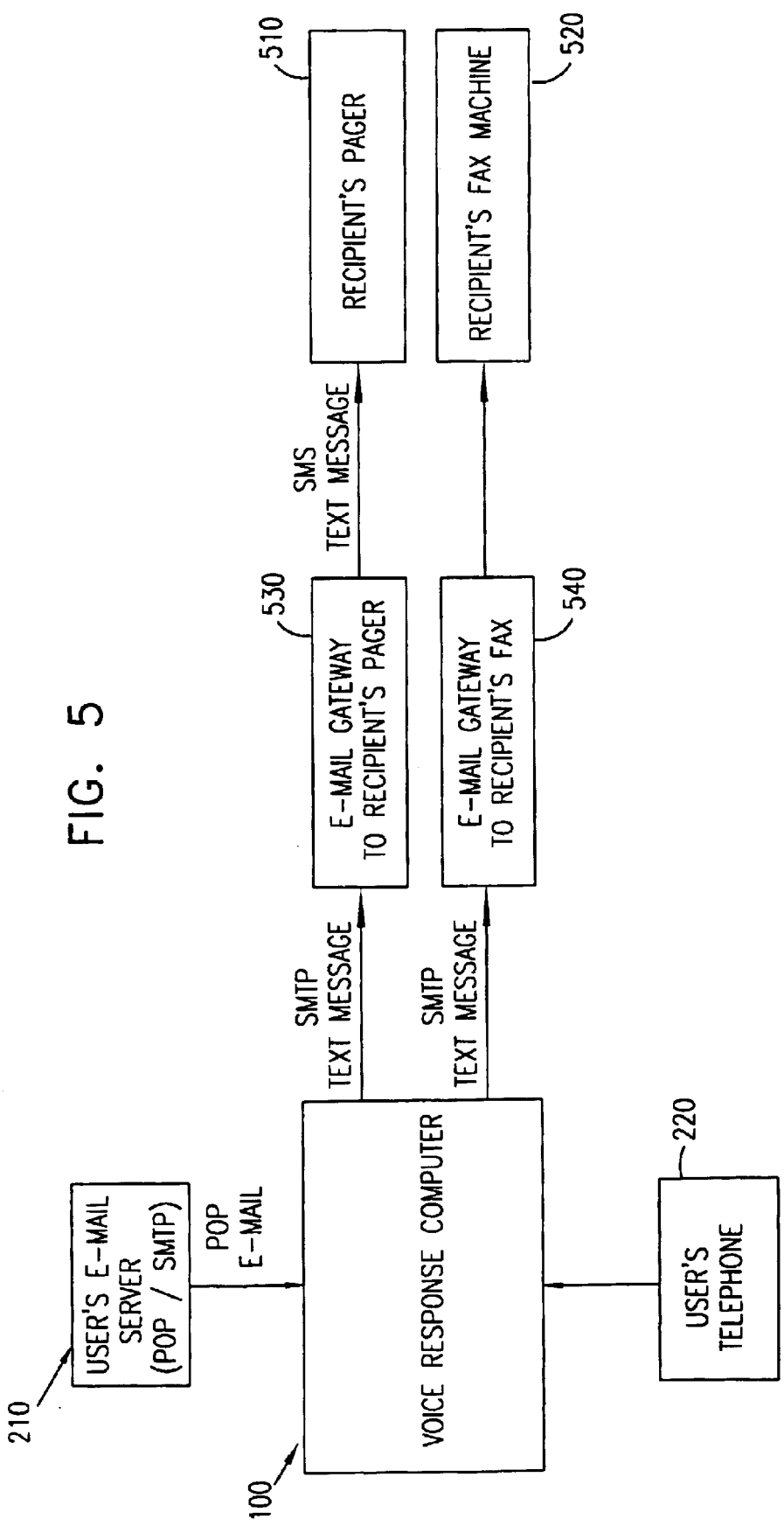
FIG. 5 is a simplified illustration of how a user can send a reply e-mail to a sender's pager and/or a sender's fax machine, in accordance with a preferred embodiment of the present invention.

Reference is now made to FIG. 5, which illustrates how a user can send an e-mail, such as a reply e-mail, to a pager or a fax machine, in accordance with a preferred embodiment of the present invention. As described hereinabove with reference to FIGS. 2A, 2B and 3, the present invention enables the user to send an e-mail, such as an e-mail reply, by dictating into a telephone. The speech message is recorded, stored as an audio file and delivered to the recipient.

FIG. 5 illustrates the alternative of converting the speech message into a text message, and sending the text message to the recipient's pager 510, or to the recipient's fax machine 520, or to both. It is for the purpose of this feature that voice response computer 100 contains speech-to-text converter 150 (FIG. 1A) for producing a text message from speech dictated into the user's telephone 220 (FIGS. 2A and 2B). Voice response computer 100 converts the user's speech reply to a text message, by means of speech-to-text converter 150. If the user elects to deliver the text message to pager 510, voice response computer 100 typically sends the text message as an outgoing e-mail to e-mail gateway 530, using the SMTP protocol.

If the user elects to deliver the text message to fax machine 520, voice response computer typically sends the text message as an outgoing e-mail to e-mail gateway 540, using the SMTP protocol. Although it is the "un-wired" mobile user who typically accesses his e-mail through a telephone unit, the present invention is also advantageous to the "wired" user who accesses his e-mail through a computer connected to a network.

For reasons of convenience, and other reasons as well, a user with a computer may nevertheless prefer to reply to e-mail messages and send new e-mail messages using speech rather than text. An indicator of this is the emergence of IP phones for speech communication over the Internet.

The present invention also provides an audio e-mail client that manages incoming and outgoing audio messages. It enables a user to dictate a voice e-mail message by speaking into a microphone connected to his computer, and to convert the speech into an audio file. The audio file can then be either (1) sent as an attachment to a standard e-mail message, or (2) posted on an Internet web site. In the latter case, a notification e-mail message with a link to the audio file is sent. It can thus be appreciated that the present invention provides voice mail-like capability to a computer user.

The audio e-mail client of the present invention may enable a user to save an audio file that is in a streaming audio format on a remote server computer or on his local computer. This feature is not available in standard REALAUDIO players. Such players are used for listening to live broadcasts over the Internet, such as newscasts, and are typically used to play an audio file once. The present invention introduces a novel use of streaming audio files; namely, for voice e-mail messages, and in this context it is important to be able to save the voice messages for future reference. In a preferred embodiment, the audio e-mail client of the present invention provides a mail archive for voice messages that is structured hierarchically in files and directories, as is commonly done today for text e-mail messages using familiar e-mail clients such as EUDORA, MICROSOFT INTERNET EXPLORER and NETSCAPE COMMUNICATOR.

When an incoming voice e-mail message is saved, the user can direct it to a specific directory or sub-directory, for cataloging and indexing purposes. Moreover the incoming voice e-mail message can be saved in a variety of formats, such as REALAUDIO, WAV or compressed WAV.

Referring back to FIG. 2B, in a preferred embodiment of the present invention the sender's computer 290 contains such an audio e-mail client 300, to play the REALAUDIO file posted by Internet web server 230 and to save the file on Internet web server 230 or on the sender's computer 290. A similar structure is applicable to a recipient using the functionality of FIG. 2A. In a preferred embodiment, the audio e-mail client of the present invention also carries out remote functions by posting voice e-mail messages on an Internet web server.

Specifically, a user can post voice e-mail messages on an Internet web site for retrieval by another person, or for purposes of archiving his own voice e-mail. Audio e-mail client 300 has the capability to manage RAM, hard diskspace and files on remote server computers, by using an appropriate protocol for uploading and storing REALAUDIO and other audio files on Internet web server 230. This is indicated in FIG. 2B by two-directional arrows between Internet web server 230 and audio e-mail client 300. Similarly, audio e-mail client 300 is used in the embodiment illustrated by FIG. 3 for the purpose of file management on a remote server computers.

Specifically, audio e-mail client 300 can archive and manage the WAV files it receives by storing them on a remote server computer such as Internet web server 230 (FIGS. 2A & 2B). The sender's voice electronic mail is thus stored on a remote computer, and accessible from his local computer. This is similar to the remote mail storage that Hotmail provides to its subscribers for text electronic mail. Reference information on Hotmail is available at http://www.hotmail.com.

In a preferred embodiment of the present invention, Internet web server 230 is part of an overall electronic voice mail management system. The overall management system also includes voice response computer 100 and, optionally, e-mail server 210. The protocol for uploading and storing files on Internet web server 230 may be proprietary, and, if so, audio e-mail client 300 sends files and instructions to Internet web server 230 in accordance with such proprietary protocol.

It should be apparent to those skilled in the art that various processing units illustrated in the various figures may reside in separate computers, or in the same computer. For example, referring to FIGS. 2A & 2B, voice response computer 100 and e-mail server 210 and Internet web server 230 may all reside within the same computer. Referring to FIG. 1A, e-mail client 120 may reside in a different computer than voice response computer 100, and, as such, need not be contained within voice response computer 100.

The system of the present invention is a multi-user system. As such, it should also be apparent to those skilled in the art that various processing units depicted in the figures may be present multiple times within the system of the present invention. For example, referring to FIG. 1A, voice response computer 100 may contain several e-mail clients 120.

Figure 6:
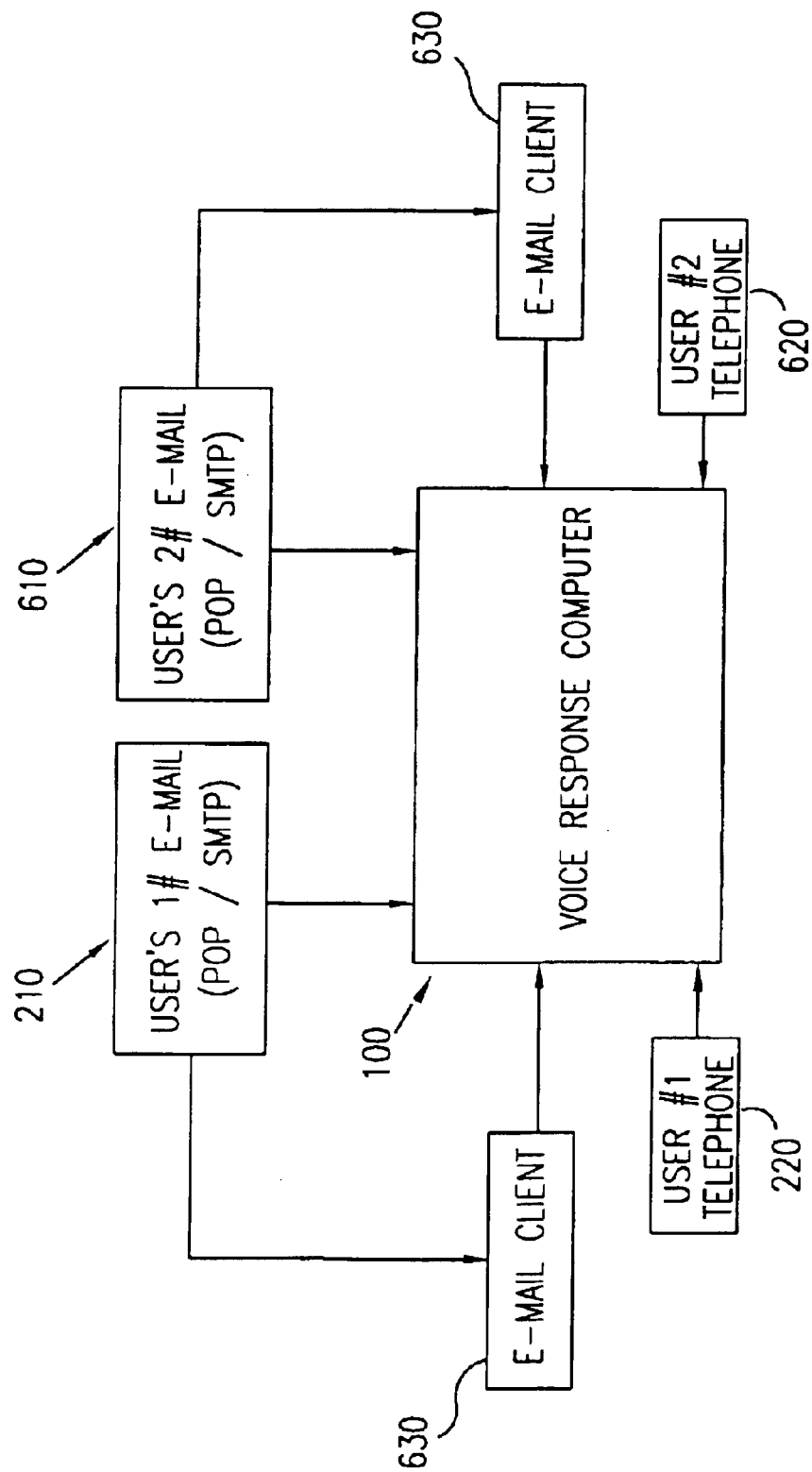
FIG. 6 is a simplified illustration of two users dialing in to a voice response computer operative in accordance with a preferred embodiment of the present invention.

Reference is now made to FIG. 6, which illustrates two users dialing in to a voice response computer operative in accordance with a preferred embodiment of the present invention. The two users are referred to as "user #1" and "user #2." Voice response computer 100 pulls e-mail from e-mail server 210 containing user #1's e-mail, and from a second e-mail server 610 containing user #2's e-mail. User #1 dials in to voice response computer 100 by means of telephone 220, and user #2 dials in by means of telephone 620.

Voice response computer 100 is connected to two e-mail clients 630 that work in parallel. Were a single e-mail client to be used, there would be only one client pulling e-mail for user #1 and user #2. Voice response computer 100 may also contain multiple text-to-speech converters 130 (FIG. 1A) and multiple e-mail parsers 170 (FIG. 1A), for simultaneously handling multiple users, rather than processing the user messaging tasks in a single queue. For multi-user systems such as the systems of the present invention, the management of processing threads is a significant factor in overall system performance.

One of the recurrent processing tasks performed by the system of the present invention is the conversion of e-mail messages from text to speech by text-to-speech converter 130 (FIG. 1A). Voice response computer 100 routinely processes an enormous volume of e-mail messages. Were a separate processing thread to be allocated for each text-to-speech task, the proliferation of threads could choke the system, resulting in poor performance. In a preferred embodiment, the present invention uses a small number of threads and uses a waiting queue for text-to-speech tasks.

Figure 7:
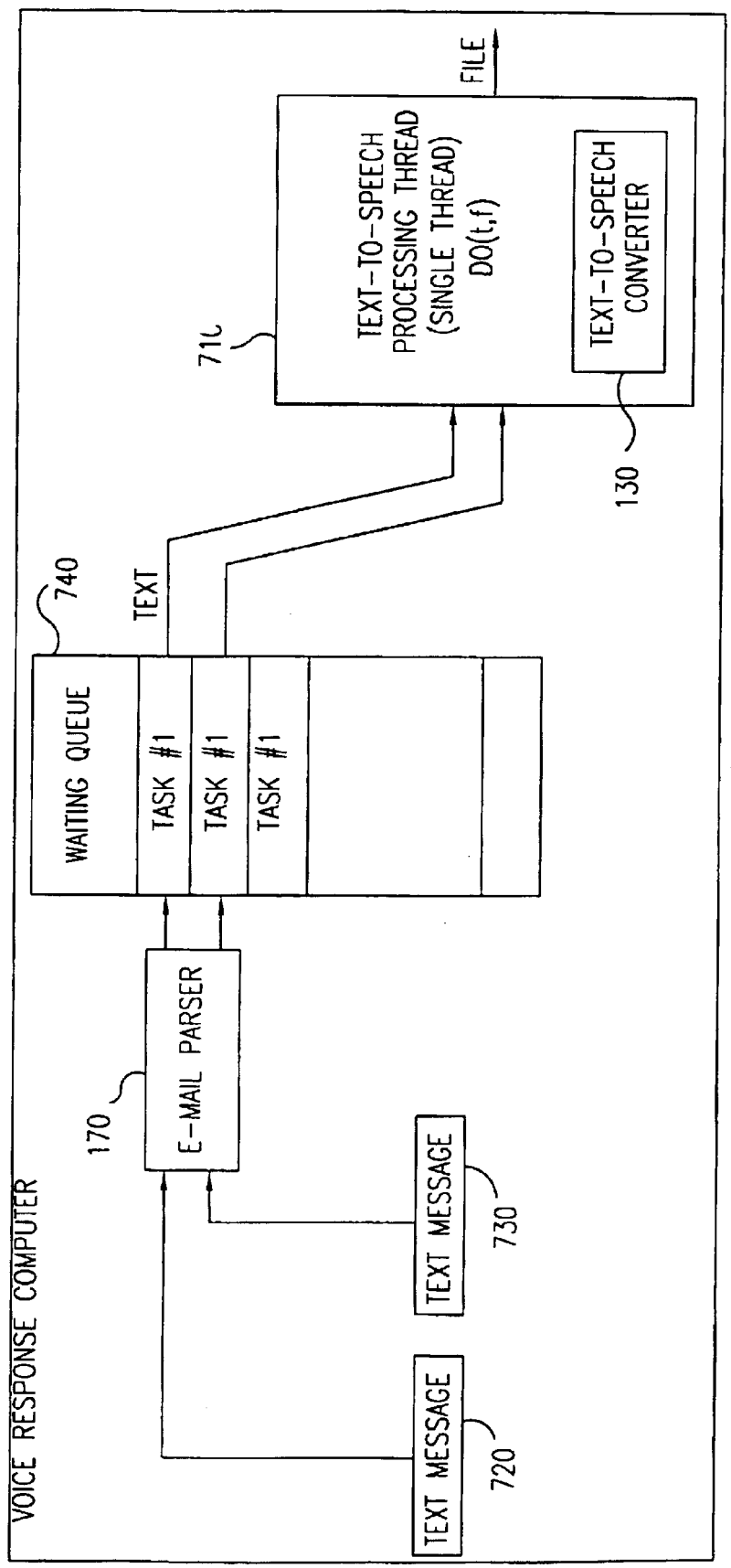
FIG. 7 is a simplified illustration of a queue for text-to-speech processing tasks in a preferred embodiment of the present invention.

Reference is now made to FIG. 7, which is a simplified illustration of a queue for text-to-speech processing tasks in a preferred embodiment of the present invention. For simplicity a single thread 710 is illustrated. Thread 710 handles each text-to-speech task, and carries out a function described as DO(t, f), where t is a text string and f is an audio file. The function DO converts text string t to speech, and saves the result in audio file f, using text-to-speech converter 130.

Shown in FIG. 7 are two e-mail text messages 720 and 730 that have been downloaded to voice response computer 100 by e-mail client 120 (FIG. 1A). Each e-mail message is to be processed by thread 710, for conversion from text to speech. The processing requests for messages 720 and 730 are temporarily stored in a waiting queue 740. As thread 710 completes each task, a new task is delivered by waiting queue 740.

One problem encountered by such a thread management system is that of "blocking." Blocking occurs when a task that requires a large amount of processing blocks other tasks that require little processing. For example, suppose message 720 is a large message and message 730 is a short message, and that message 720 is ahead of message 730 in queue 740. Then the text-to-speech processing for message 730 would be deferred until message 720 is completely converted into speech.

The present invention overcomes the problem of blocking, in a preferred embodiment, by parsing each message into small units, such as individual sentences, by e-mail parser 170. Each sentence is then individually sent to queue 740 for input to thread 710 as a separate text-to-speech conversion task. In this way, the short message 730 may enter queue 740 at a queue position between the sentences of message 720, and thus be processed by thread 710 before the processing of message 720 is finished. E-mail parser 170 may use punctuation marks as a basis for parsing messages into individual sentences.

E-mail parser 170 may include a pre-parsing module which, in a preferred embodiment of the present invention is implemented as a PERL module. The pre-parsing module may perform text substitutions, insertions and deletions which may improve the understandability of text to speech conversions.

It should be apparent to those skilled in the art that other methods of parsing may be used instead, and that messages may be parsed into units other than sentences as well. For example, for uniformity of size, messages may be parsed into units of consecutive words whose total size does not exceed 100 characters. It should also be apparent to those skilled in the art that multiple e-mail parsers 170 may be present within voice response computer 100, in order to process multiple e-mail messages in parallel.

The present invention is also useful within a "buddy system." Such a system is based upon a "buddy list," which is a list of friends, or members, who wish to be notified when any members of the list are on-line. An example of such a system is the Mirabilis ICQ ("I seek you") system for notifying the other members when a member of the list is connected to the Internet. Reference information on the ICQ system is available on the Internet at http://www.icq.com.

Within the context of the present invention, voice response computer 100 can be programmed to notify members of a "buddy list" whenever a user who is one of the members dials in to his voice response computer. Upon notification the members are alerted that the user is currently dialed in to his voice response computer, and, as such, can be contacted therefrom. It should be appreciated that the buddy list notification may be employed by the user to send a message to a buddy.

Figure 8:
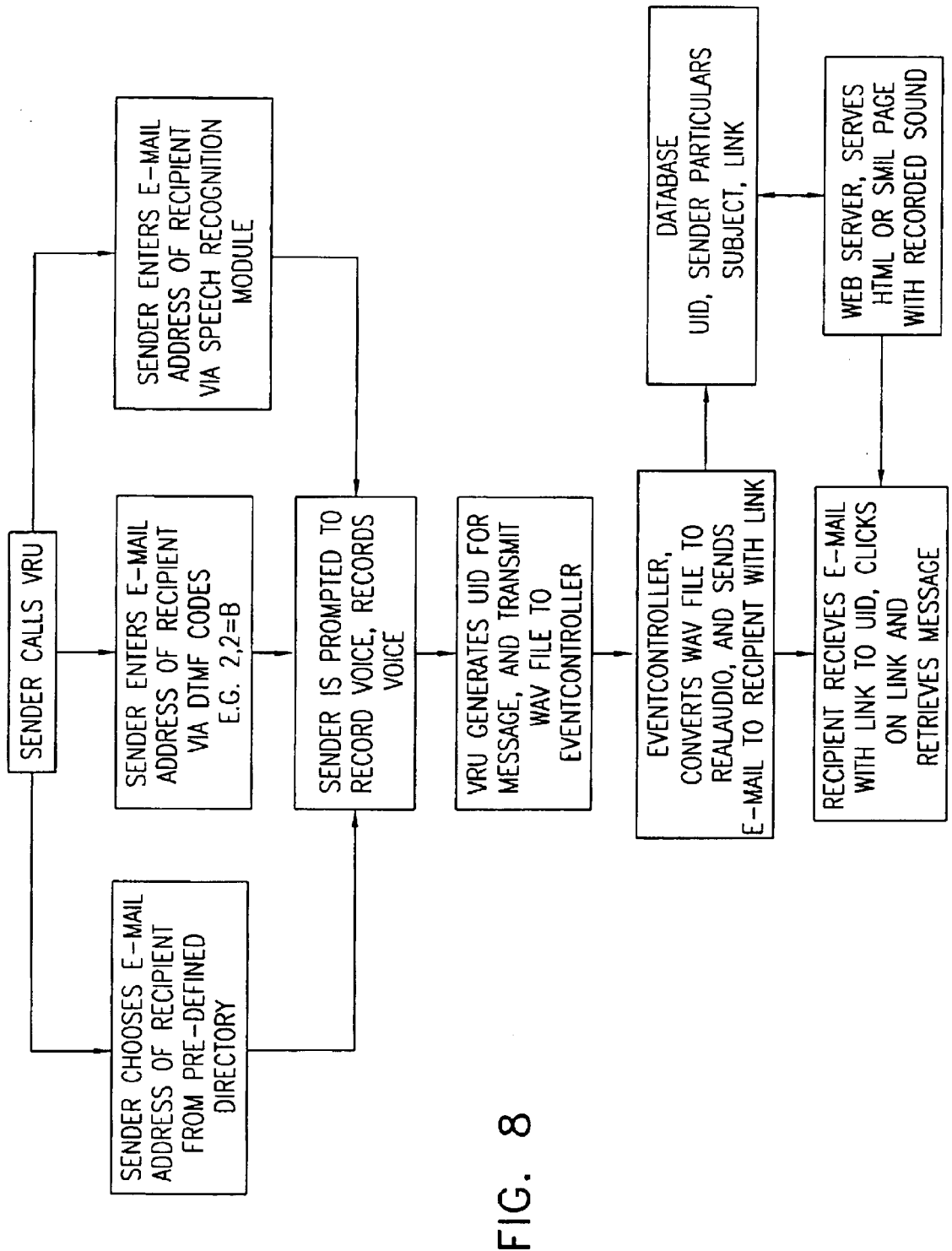
FIG. 8 is a simplified illustration of initiation of a voice e-mail message from a telephone.

Reference is now made to FIG. 8 which is a simplified illustration of initiation of a voice e-mail message from a telephone in accordance with a preferred embodiment of the present invention. As seen in FIG. 8, a person who wishes to send a voice e-mail uses a POTS telephone to call a voice response unit (VRU). Once a connection has been made to the VRU, the sender may enter an intended recipient's e-mail address either by choosing an entry from the predefined directory listing, via DTMF codes on the POTS telephone or alternatively or additionally by speaking via a speech recognition module.

The sender is typically prompted to record a voice message and does so. The VRU then generates a unique identifier (UID) for the voice message and transmits the recorded voice message, typically in a WAV format to an event controller. The event controller preferably saves the WAV formatted data to a file converts it to a REALAUDIO file and sends an e-mail to the intended recipient with a link to the REALAUDIO and the WAV files. The event controller also preferably inserts an audio file listing database information corresponding to the voice message, typically including the UID, the particulars of the sender, the subject of the voice message and the links to the REALAUDIO and WAV files.

The recipient receives the e-mail, which provides the link with the UID, and clicks on the link to receive the voice message. The recipient's computer contacts the web server, which connects to the audio file listing database and retrieves a link to the voice message. The link is employed by the recipient's computer to play the voice message.

Figure 9:
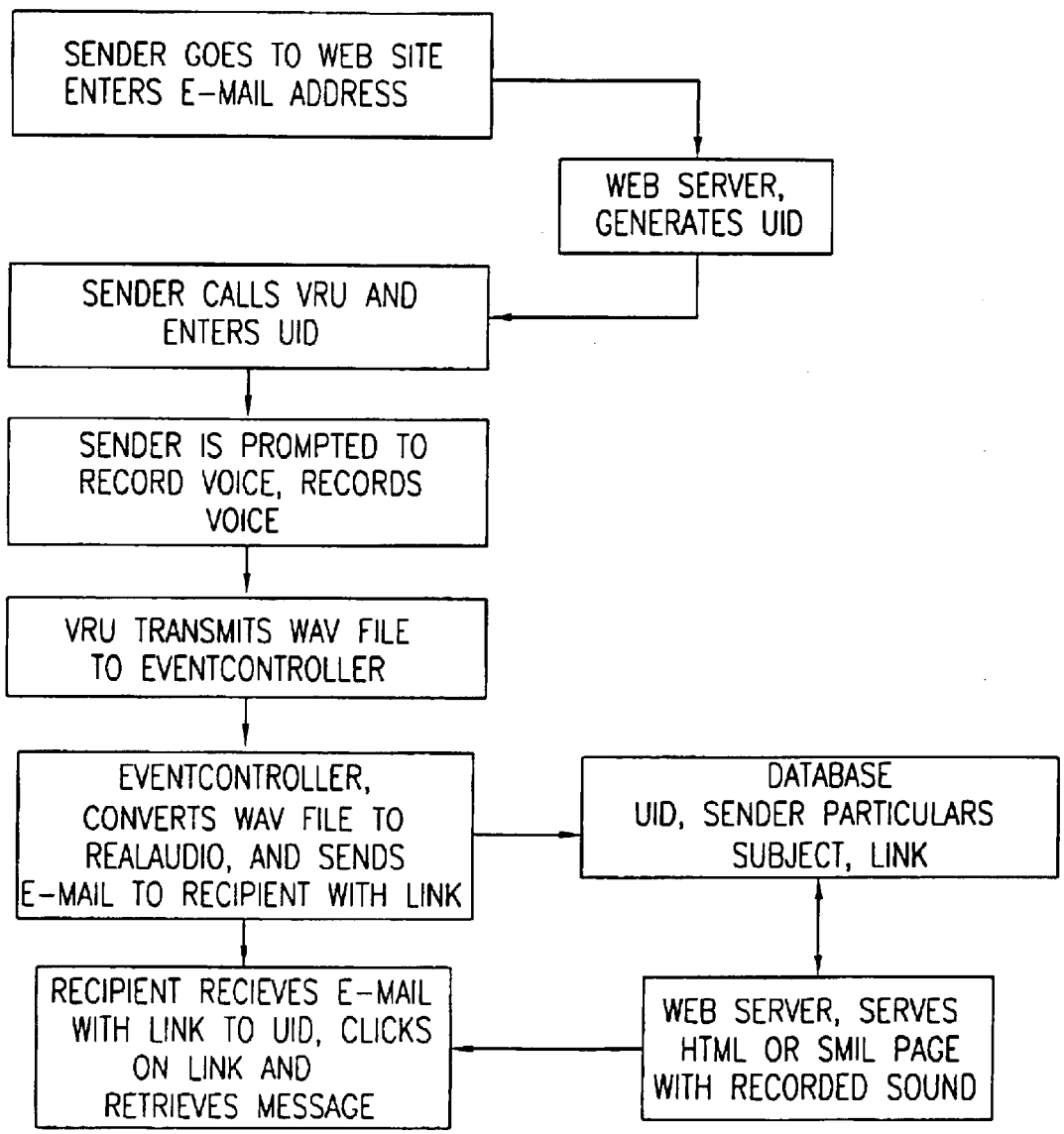
FIG. 9 is a simplified illustration of initiation of a voice e-mail message using both a web server and a telephone.

Reference is now made to FIG. 9, which is a simplified illustration of initiation of a voice e-mail message using both a web server and a telephone. In the embodiment of FIG. 9, a person intending to send a voice message submits a form bearing the intended recipient's e-mail address as well as his own e-mail address and the subject of the voice message. The form is directed to a web server which generates a UID and transmits the UID to the sender. The sender then telephones a VRU using a POTS telephone and enters the UID. The sender is typically prompted to record a voice message and does so. The VRU then transmits the recorded voice message, typically in a WAV format to an event controller.

The event controller preferably saves the WAV formatted data to a file, converts it to a REALAUDIO file and sends an e-mail to the intended recipient with a link to the REALAUDIO and the WAV files. The event controller also preferably inserts an audio file listing database information corresponding to the voice message, typically including the UID, the particulars of the sender, the subject of the voice message and the links to the REALAUDIO and WAV files.

The recipient receives the e-mail which provides the link with the UID and clicks on the link to receive the voice message. The recipient's computer contacts a web server which connects to the audio file listing database and retrieves a link to the voice message, which link is employed by the recipient's computer to play the voice message.

Figure 10:
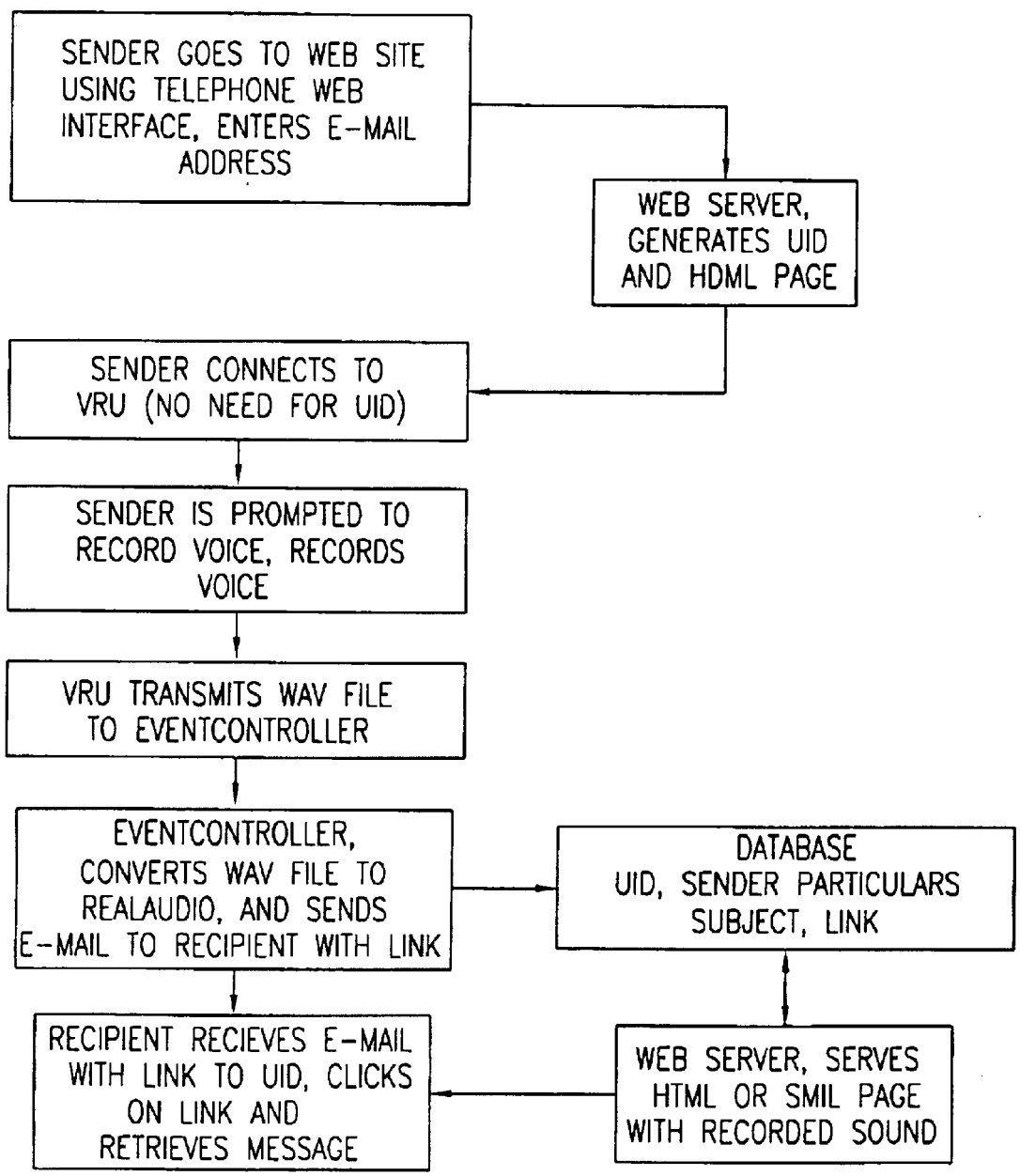
FIG. 10 is a simplified illustration of initiation of a voice e-mail message using a telephone which has a web interface.

Reference is now made to FIG. 10 which is a simplified illustration of initiation of a voice e-mail message using a telephone having a web interface. In the embodiment of FIG. 10, a person intending to send a voice message using a telephone web interface, such as an HDML UPLink enabled hand-held device commercially available from suppliers such as Motorola (see http://www.phone.com), submits a form bearing the intended recipient's e-mail address as well as his own e-mail address and the subject of the voice message.

The form is directed to a web server which generates a UID and a telephone compatible Internet communication language such as HDML page and transmits the UID hidden in the a telephone compatible Internet communication language such as HDML page to the sender. The sender then initiates a telephone call to a VRU, typically by pressing a button on the UPLink device. The sender is typically prompted to record a voice message and does so. The VRU then transmits the recorded voice message, typically in a WAV format to an event controller.

The event controller preferably saves the WAV formatted data to a file, converts it to a REALAUDIO file and sends an e-mail to the intended recipient with a link to the REALAUDIO and the WAV files. The event controller also preferably inserts an audio file listing database information corresponding to the voice message, typically including the UID, the particulars of the sender, the subject of the voice message and the links to the REALAUDIO and WAV files.

The recipient receives the e-mail which provides the link with the UID and clicks on the link to receive the voice message. The recipient's computer contacts a web server which connects to the audio file listing database and retrieves a link to the voice message, which link is employed by the recipient's computer to play the voice message.

Figure 11:
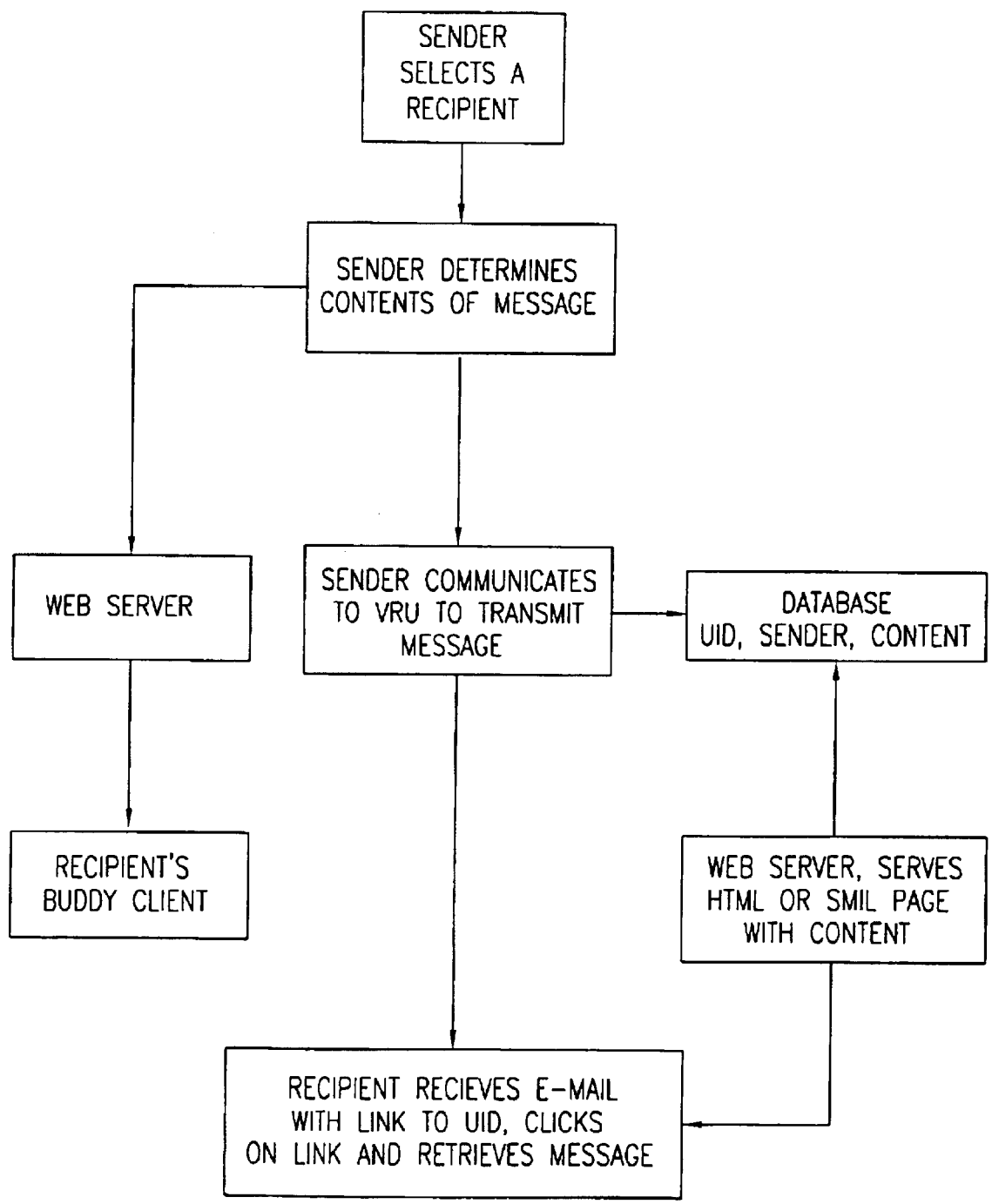
FIG. 11 is a simplified illustration of initiation of an e-mail message using a telephone.

Reference is now made to FIG. 11, which is a simplified illustration of a method of sending a message, such as an e-mail message, using a telephone having a web interface. A person intending to send a message, with or without a voice portion, enters an intended recipient's e-mail address using any suitable method, such as those described hereinabove with reference to any of FIGS. 8, 9 and 10. Another method of choosing a recipient is to use a telephone compatible Internet communication language such as HDML enabled telephone and to choose a buddy contact from a buddy list.

The sender determines the contents of the message, which may or may not include voice, by employing a VRU and instructing the VRU to send the message or alternatively by accessing a telephone compatible Internet communication language such as HDML page on a web server.

When a VRU is employed, the VRU inserts into a message content database the particulars of the contents as well as the UID and the particulars of the sender. If a recorded voice is part of the message, the remainder of the procedure may be similar to that described hereinabove with respect to any of FIGS. 8–10. Otherwise, the VRU may send the e-mail message directly to the recipient.

Alternatively, the web server may send a message to the recipient's buddy client using a buddy protocol.

Figure 12:
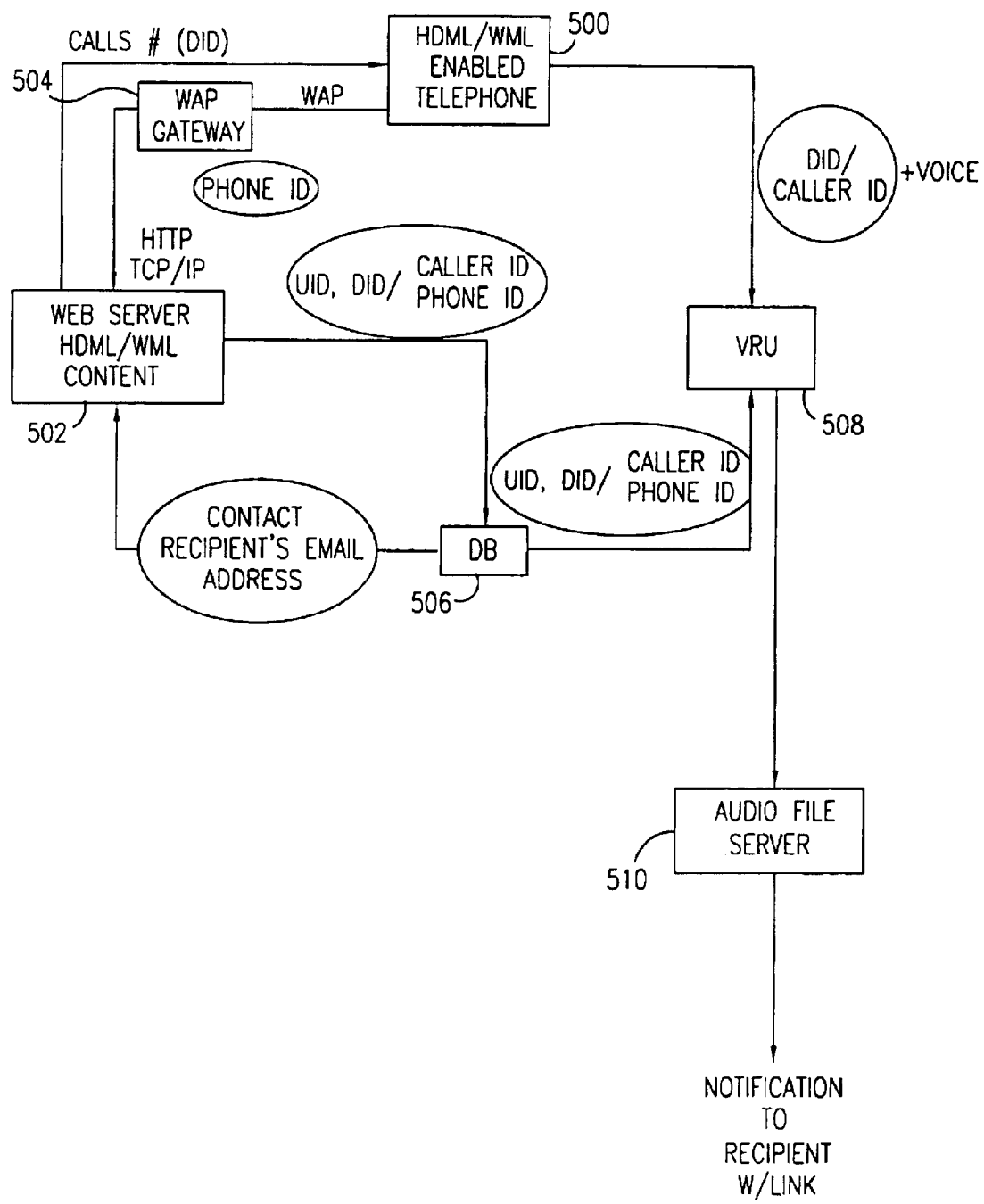
FIG. 12 is a simplified illustration of data and voice communication using a web-enabled telephone in accordance with a preferred embodiment of the present invention.

Reference is now made to FIG. 12, which illustrates communication between a web-enabled telephone and both a web server and a voice response computer (VRU). This type of communication may be particularly useful in various commercial applications wherein internet data communications as well as voice communications may be carried out by a user from his web-enabled telephone with a commercial entity. The two types of communication may be simultaneous and are normally asynchronous.

In a preferred embodiment of the present invention, a user, using an HDML/WML enabled telephone 500, or any other telephone capable of telephone compatible Internet communication establishes a connection with a web server 502, which is preferably similarly enabled. The communication between the telephone 500 and the web server 502 preferably employs the Wireless Application Protocol (WAP) as well as HTTP and TCP/IP protocols and is established via a WAP gateway 504.

The user transmits, from his HDML/WMLenabled telephone 500, an identifier to the web server 502. The identifier (PHONE ID) is normally associated with telephone 500 and is transmitted automatically without requiring user action. Alternatively or additionally the web server 502 generates an unique identifier. Concurrently, the identifier (UID), whether generated by the telephone 500 or the web server 502 is stored in a database 506.

The user chooses a recipient and notifies the web server 502 accordingly. He may indicate the recipient by an input entered using his telephone 500, either sua sponte or by selecting a specific recipient from a list presented to him either by the telephone 500 or the web server 502 which may access the database 506 to retrieve contact information, such as the recipient's e-mail address.

The web server 502 associates the chosen recipient with the identifier (UID) in the database 506.

The user then establishes voice communication between telephone 500 and a voice response computer unit 508. This voice communication may be initiated by the user sua sponte or in response to a prompt from the web server or, as a further, most preferred alternative, automatically by the web server 502 or the telephone 500 in response to the chosen recipient.

The intended recipient of the voice communication may be represented by a DID (telephone number) provided by the web server 502 (CALLS # ID).

Additionally or alternatively, the caller ID or the DID, transmitted by the telephone 500, may serve as the identifier of the intended recipient of the voice communication, described above. Where this is not the case, the voice response computer unit 508 accesses the database 506 to establish a correlation between the identity of the intended recipient and the identifier, which may be the caller ID and/or DID.

The user may choose one of a number of activity options. Some examples of such activity options are set forth hereinbelow:

The user may record a message (by transmitting his voice from telephone 500 to VRU 508) such as an e-mail message, which is sent to an audio file server 510 and is encoded thereat. The audio file 510 may then send a notification to the intended recipient.

The user may provide voice activation of an application (not shown).

The user may listen to voice messages (not shown).

It will be appreciated by persons skilled in the art that the present invention is not limited by what has been particularly shown and described hereinabove. Rather the present invention includes combinations and sub-combinations of the various features described hereinabove as well as modifications and extensions thereof which would occur to a person skilled in the art and which do not fall within the prior art.

What is claimed is:

1. A communication system comprising:
   a telephone network including a multiplicity of telephones interconnected by telephone network interconnections;
   a computer network having a multiplicity of nodes and enabling non-streaming Internet protocol communication between said nodes,
   the computer network enabling e-mail communication between said nodes;
   streaming audio link communication apparatus communicating to the telephone network a link to streaming audio via said non-streaming Internet protocol communication;
   a streaming audio player operative to play said streaming audio from said computer network over at least a portion of said telephone network interconnections; and
   a multiplicity of voice response computers, each voice response computer being connected to a node of said computer network and being actuated by an input received from one of said multiplicity of telephones via said telephone network for communicating voice received via said one of said multiplicity of telephones via a non-streaming Internet protocol over said computer network,
   wherein the system also provides Instant Messaging protocol functionality whereby communications are sent to user-selected destinations via said computer network.

2. A communication system according to claim 1 and also providing Instant Messaging protocol functionality whereby communications are sent to user-selected destinations via said computer network indicating that a user is communicating using a user's telephone via said telephone network with a user's voice response computer.

3. A communication system according to claim 1 and also providing Instant Messaging protocol functionality whereby communications are sent to user-selected destinations via said computer network indicating that a user has communicated voice via said telephone network and said computer network using a users telephone and a users voice response computer.

4. A communication system according to claim 1, and wherein said voice response computers are operative to convert Dual Tone Multi Frequency (DTMF) to an Instant Messaging communication protocol.

5. A communication system comprising:
   a telephone network including a multiplicity of telephones interconnected by telephone network interconnections;
   a computer network having a multiplicity of nodes and enabling non-streaming Internet protocol communication between said nodes;
   streaming audio link communication apparatus communicating to the telephone network a link to streaming audio via said non-streaming Internet protocol communication;
   a streaming audio player operative to play said streaming audio from said computer network over at least a portion of said telephone network interconnections; and
   a multiplicity of voice response computers, each voice response computer being connected to a node of said computer network and being actuated by an input received from one of said multiplicity of voice response computers via said computer network for receiving voice communicated via a non-streaming Internet protocol over said computer network and providing a voice output to a telephone via said telephone network,
   wherein the system also provides Instant Messaging protocol functionality whereby communications are sent from user-selected destinations via said computer network.

6. A communication system according to claim 5 and also providing Instant Messaging protocol functionality whereby communications are sent from user-selected destinations via said computer network indicating that a user is communicating using a user's telephone via said telephone network with a user's voice response computer.

7. A communication system according to claim 5 and also providing Instant Messaging protocol functionality whereby communications are sent from user-selected destinations via said computer network indicating that a user has communicated voice via said telephone network and said computer network using a user's telephone and a user's voice response computer.

8. A communication system according to claim 5 and wherein said voice response computers are capable of sensing the presence of a link to an audio file.

9. A communication system according to claim 8 and wherein said voice response computers are capable of accessing said audio file via said link for playing said audio file to a recipient.

10. A communication system comprising:
    a telephone network including a multiplicity of telephones interconnected by telephone network interconnections;
    a computer network having a multiplicity of nodes and enabling non-streaming Internet protocol communication between said nodes,
    the computer network enabling e-mail communication between said nodes;
    streaming audio link communication apparatus communicating to the telephone network a link to streaming audio via said non-streaming Internet protocol communication;
    a streaming audio player operative to play said streaming audio from said computer network over at least a portion of said telephone network interconnections; and
    a multiplicity of voice response computers, each voice response computer being connected to a node of said computer network and being actuated by an input received from one of said multiplicity of telephones via said telephone network for communicating voice received via said one of said multiplicity of telephones via a non-streaming Internet protocol over said computer network, each voice response computer also being actuated by an input received from one of said multiplicity of voice response computers via said computer network for receiving voice communicated via a non-streaming Internet protocol over said computer network and providing a voice output to a telephone via said telephone network, the system also providing Instant Messaging protocol functionality whereby communications are sent to user-selected destinations via said computer network.

11. A communication system according to claim 10 and also providing Instant Messaging protocol functionality whereby communications are sent to user-selected destinations via said computer network indicating that a user is communicating using a user's telephone via said telephone network with a user's voice response computer.

12. A communication system according to claim 10 and also providing Instant Messaging protocol functionality whereby communications are sent to user-selected destinations via said computer network indicating that a user has communicated voice via said telephone network and said computer network using a user's telephone and a user's voice response computer.

13. A communication system comprising:
a telephone network including a multiplicity of telephones interconnected by telephone network interconnections,
wherein said telephone network comprises a cellular telephone network;
a computer network having a multiplicity of nodes and enabling non-streaming Internet protocol communication between said nodes;
streaming audio link communication apparatus communicating to the telephone network a link to streaming audio via said non-streaming Internet protocol communication;
a streaming audio player operative to play said streaming audio from said computer network over at least a portion of said telephone network interconnections; and
a multiplicity of computers, each computer being connected to a node of said computer network and being actuated by an input received from one of said multiplicity of telephones via said telephone network for communicating messages received via said one of said multiplicity of telephones via a telephone compatible Internet communication language over said computer network, at least one of senders or recipients of said messages being user-selected destinations.

14. A communication system comprising:
a telephone network including a multiplicity of telephones interconnected by telephone network interconnections,
wherein said telephone network comprises a cellular telephone network;
a computer network having a multiplicity of nodes and enabling non-streaming Internet protocol communication between said nodes;
streaming audio link communication apparatus communicating to the telephone network a link to streaming audio via said non-streaming Internet protocol communication;
a streaming audio player operative to play said streaming audio from said computer network over at least a portion of said telephone network interconnections; and
a multiplicity of computers, each computer being connected to a node of said computer network and being actuated by an input received from one of said multiplicity of voice response computers via said computer network for receiving messages communicated via a telephone compatible Internet communication language over said computer network and providing a telephone compatible Internet communication language output to a telephone via said telephone network, at least one of senders or recipients of said messages being user-selected destinations.

15. A communication system comprising:
a telephone network including a multiplicity of telephones interconnected by telephone network interconnections,
wherein said telephone network comprises a cellular telephone network;
a computer network having a multiplicity of nodes and enabling non-streaming Internet protocol communication between said nodes;
streaming audio link communication apparatus communicating to the telephone network a link to streaming audio via said non-streaming Internet protocol communication; and
a streaming audio player operative to play said streaming audio from said computer network over at least a portion of said telephone network interconnections; and
a multiplicity of computers, each computer being connected to a node of said computer network and being actuated by an input received from one of said multiplicity of telephones via said telephone network for communicating messages received via said one of said multiplicity of telephones via a telephone compatible Internet communication language over said computer network, each computer also being actuated by an input received from one of said multiplicity of computers via said computer network for receiving messages communicated over said computer network and providing a telephone compatible Internet communication language output to a telephone via said telephone network, at least one of senders or recipients of said messages being user-selected destinations.

16. A communication system comprising:
a telephone network including a multiplicity of telephones interconnected by telephone network interconnections:
a computer network having a multiplicity of nodes and enabling non-streaming Internet protocol communication between said nodes, the computer network enabling e-mail communication between said nodes;
streaming audio link communication apparatus communicating to the telephone network a link to streaming audio via said non-streaming Internet protocol communication; and
a streaming audio player operative to play said streaming audio from said computer network over at least a portion of said telephone network interconnections;
at least one database connected to said computer network and storing e-mail communications between said nodes; and
at least one voice response computer connected at a node of said computer network, and said at least one voice response computer being capable of accessing said at least one database;
and wherein at least one proxy is interposed between said at least one voice response computer and said at least one database.

17. A communication system comprising:
a telephone network including a multiplicity of telephones interconnected by telephone network interconnections;
a computer network having a multiplicity of nodes and enabling non-streaming Internet protocol communication between said nodes, the computer network enabling e-mail communication between said nodes;

streaming audio link communication apparatus communicating to the telephone network a link to streaming audio via said non-streaming Internet protocol communication;

a streaming audio player operative to play said streaming audio from said computer network over at least a portion of said telephone network interconnections; and a multiplicity of voice response computers, each voice response computer being connected to a node of said computer network and being actuated by an input received from one of said multiplicity of telephones via said telephone network for communicating voice received via said one of said multiplicity of telephones via e-mail over said computer network;

and wherein said voice response computers communicate with a database.

18. A communication system according to claim 17 and wherein said database is a Structured Query Language (SQL) database.

19. A communication system comprising:

a telephone network including a multiplicity of telephones interconnected by telephone network interconnections;

a computer network having a multiplicity of nodes and enabling non-streaming Internet protocol communication between said nodes, the computer network enabling e-mail communication between said nodes;

streaming audio link communication apparatus communicating to the telephone network a link to streaming audio via said non-streaming Internet protocol communication;

a streaming audio player operative to play said streaming audio from said computer network over at least a portion of said telephone network interconnections; and a multiplicity of voice response computers, each voice response computer being connected to a node of said computer network and being actuated by an input received from one of said multiplicity of telephones via said telephone network for communicating voice received via said one of said multiplicity of telephones via e-mail over said computer network;

and wherein said multiplicity of voice response computers is actuated by the sender choosing an e-mail address of a recipient from a pre-defined directory.

20. A communication system comprising:

a telephone network including a multiplicity of telephones interconnected by telephone network interconnections;

a computer network having a multiplicity of nodes and enabling non-streaming Internet protocol communication between said nodes, the computer network enabling e-mail communication between said nodes;

streaming audio link communication apparatus communicating to the telephone network a link to streaming audio via said non-streaming Internet protocol communication;

a streaming audio player operative to play said streaming audio from said computer network over at least a portion of said telephone network interconnections; and a multiplicity of voice response computers, each voice response computer being connected to a node of said computer network and being actuated by an input received from one of said multiplicity of telephones via said telephone network for communicating voice received via said one of said multiplicity of telephones via e-mail over said computer network;

and wherein said multiplicity of voice response computers are actuated by the sender entering an e-mail address of a recipient via Dual Tone Multi Frequency (DTMF) codes.

21. A communication system according to claim 20 and wherein said multiplicity of voice response computers are operative to store in a directory, e-mail addresses entered by a sender.

22. A communication system according to claim 21 and wherein said multiplicity of voice response computers is actuated by the sender entering an e-mail address of a recipient via speech recognition by one of said multiplicity of voice response computers.

23. A communication system comprising:

a telephone network including a multiplicity of telephones interconnected by telephone network interconnections;

a computer network having a multiplicity of nodes and enabling non-streaming Internet protocol communication between said nodes;

streaming audio link communication apparatus communicating to the telephone network a link to streaming audio via said non-streaming Internet protocol communication;

a streaming audio player operative to play said streaming audio from said computer network over at least a portion of said telephone network interconnections;

a recorder recording a sender's voice;

a web server storing the sender's voice, said web server storing the sender's voice together with the meta-information associated therewith in a single storage unit; and a notifier sending a notification to at least one recipient, said notification containing a link enabling retrieval of the sender's voice from said web server;

and wherein the recorder spools the senders voice to a local storage facility.

24. A communication system comprising:

a telephone network including a multiplicity of telephones interconnected by telephone network interconnections;

a computer network having a multiplicity of nodes and enabling non-streaming Internet protocol communication between said nodes;

streaming audio link communication apparatus communicating to the telephone network a link to streaming audio via said non-streaming Internet protocol communication;

a streaming audio player operative to play said streaming audio from said computer network over at least a portion of said telephone network interconnections;

a recorder recording a sender's voice;

a web server storing the sender's voice, said web server storing the sender's voice together with the meta-information associated therewith in a single storage unit;

a notifier sending a notification to at least one recipient, said notification containing a link enabling retrieval of the sender's voice from said web server; and a transmitter transmitting a sender's voice;

and wherein said transmitter transmits said sender's voice via Hypertext Transfer Protocol (HTTP) PUT to said web server.

25. A communication system comprising:
a telephone network including a multiplicity of telephones interconnected by telephone network interconnections;
a computer network having a multiplicity of nodes and enabling non-streaming Internet protocol communication between said nodes;
streaming audio link communication apparatus communicating to the telephone network a link to streaming audio via said non-streaming Internet protocol communication;
a streaming audio player operative to play said streaming audio from said computer network over at least a portion of said telephone network interconnections;
a recorder recording a sender's voice;
a web server storing the sender's voice, said web server storing the sender's voice together with the meta-information associated therewith in a single storage unit;
a notifier sending a notification to at least one recipient, said notification containing a link enabling retrieval of the sender's voice from said web server; and
a transmitter transmitting a sender's voice;
and wherein the transmitter spools the sender's voice to a Simple Mail Transfer Protocol (SMTP) server.

26. A communication system comprising:
a telephone network including a multiplicity of telephones interconnected by telephone network interconnections;
a computer network having a multiplicity of nodes and enabling non-streaming Internet protocol communication between said nodes;
streaming audio link communication apparatus communicating to the telephone network a link to streaming audio via said non-streaming Internet protocol communication;
a streaming audio player operative to play said streaming audio from said computer network over at least a portion of said telephone network interconnections;
a recorder recording a senders voice;
a web server storing the sender's voice, said web server storing the senders voice together with the meta-information associated therewith in a single storage unit;
a notifier sending a notification to at least one recipient, said notification containing a link enabling retrieval of the sender's voice from said web server; and
a transmitter transmitting a sender's voice;
and wherein the transmitter encodes a sender's voice in a compressed format.

27. A communication system comprising:
a telephone network including a multiplicity of telephones interconnected by telephone network interconnections;
a computer network having a multiplicity of nodes and enabling non-streaming Internet protocol communication between said nodes;
streaming audio link communication apparatus communicating to the telephone network a link to streaming audio via said non-streaming Internet protocol communication;
a streaming audio player operative to play said streaming audio from said computer network over at least a portion of said telephone network interconnections;
a recorder recording a sender's voice;
a web server storing the senders voice, said web server storing the senders voice together with the meta-information associated therewith in a single storage unit; and
a notifier sending a notification to at least one recipient, said notification containing a link enabling retrieval of the sender's voice from said web server;
and wherein said web server is operative to encode multiple senders' voices simultaneously.

28. A communication system comprising:
a telephone network including a multiplicity of telephones interconnected by telephone network interconnections;
a computer network having a multiplicity of nodes and enabling non-streaming Internet protocol communication between said nodes;
streaming audio link communication apparatus communicating to the telephone network a link to streaming audio via said non-streaming Internet protocol communication;
a streaming audio player operative to play said streaming audio from said computer network over at least a portion of said telephone network interconnections;
a recorder recording a sender's voice;
a web server storing the senders voice, said web server storing the sender's voice together with the meta-information associated therewith in a single storage unit; and
a notifier sending a notification to at least one recipient, said notification containing a link enabling retrieval of the sender's voice from said web server;
and wherein said web server includes functionality which associates user preferences with recorded user voice elements.

29. A communication system comprising:
a telephone network including a multiplicity of telephones interconnected by telephone network interconnections;
a computer network having a multiplicity of nodes and enabling non-streaming Internet protocol communication between said nodes;
streaming audio link communication apparatus communicating to the telephone network a link to streaming audio via said non-streaming Internet protocol communication;
a streaming audio player operative to play said streaming audio from said computer network over at least a portion of said telephone network interconnections;
a recorder recording a sender's voice;
a web server storing the sender's voice, said web server storing the sender's voice together with the meta-information associated therewith in a single storage unit; and
a notifier sending a notification to at least one recipient, said notification containing a link enabling retrieval of the sender's voice from said web server;
and wherein said link connects to at least an advertising medium.

30. A communication system according to claim 29, and wherein said link also connects to an audio file.

31. A communication system comprising:
a telephone network including a multiplicity of telephones interconnected by telephone network interconnections;
a computer network having a multiplicity of nodes and enabling non-streaming Internet protocol communication between said nodes, wherein the computer network enables e-mail communication between said nodes;
streaming audio link communication apparatus communicating to the telephone network a link to streaming audio via said non-streaming Internet protocol communication;

a streaming audio player operative to play said streaming audio from said computer network over at least a portion of said telephone network interconnections; and at least one database connected to said computer network and storing e-mail communications between said nodes;

wherein each of said multiplicity of databases contains a plurality of mail tables, wherein each mail table has assigned thereto a limited number of users.

32. A communication system comprising:

a telephone network including a multiplicity of telephones interconnected by telephone network interconnections;

a computer network having a multiplicity of nodes and enabling non-streaming Internet protocol communication between said nodes, wherein the computer network enables e-mail communication between said nodes;

streaming audio link communication apparatus communicating to the telephone network a link to streaming audio via said non-streaming Internet protocol communication;

a streaming audio player operative to play said streaming audio from said computer network over at least a portion of said telephone network interconnections; and at least one database connected to said computer network and storing e-mail communications between said nodes;

and wherein at least one of said multiplicity of databases includes a list of destination addresses.

33. A communication system according to claim 32 and wherein said list comprises a multiplicity of lists of destination addresses.

34. A communication system according to claim 33 and wherein at least one of said multiplicity of databases includes a meta-list for indexing and multiplicity of lists.

35. A communication system comprising:

a telephone network including a multiplicity of telephones interconnected by telephone network interconnections;

a computer network having a multiplicity of nodes and enabling non-streaming Internet protocol communication between said nodes;

streaming audio link communication apparatus communicating to the telephone network a link to streaming audio via said non-streaming Internet protocol communication;

a streaming audio player operative to play said streaming audio from said computer network over at least a portion of said telephone network interconnections;

a text-to-speech converter converting an e-mail message from text to speech;

a receiver receiving an input request for a selected e-mail message;

an audio player reading the selected e-mail message;

an audio recorder recording a reply to the selected e-mail message, producing an audio file; and a transmitter sending the audio file as an attachment to a reply e-mail.

36. The system of claim 35 wherein the audio file is a Wave file.

37. The system of claim 36 wherein the audio file is a compressed Wave file.

38. The system of claim 35 and also including a downloader downloading an e-mail message from an e-mail server.

39. The system of claim 35 and also including a mail forwarder forwarding the selected e-mail message to a pager.

40. The system of claim 35 and also including a mail forwarder forwarding the selected e-mail message to a fax machine.

41. A communication system comprising:

a telephone network including a multiplicity of telephones interconnected by telephone network interconnections;

a computer network having a multiplicity of nodes and enabling non-streaming Internet protocol communication between said nodes;

streaming audio link communication apparatus communicating to the telephone network a link to streaming audio via said non-streaming Internet protocol communication;

a streaming audio player operative to play said streaming audio from said computer network over at least a portion of said telephone network interconnections;

a text-to-speech converter converting an e-mail message from text to speech;

a receiver receiving an input request for a selected e-mail message;

an audio player reading the selected e-mail message;

an audio recorder recording a reply to the selected e-mail message, producing and audio file;

a computer storing the audio file; and a transmitter sending a reply e-mail containing a link to the audio file.

42. The system of claim 41 wherein the audio file is a RealAudio file.

43. The system of claim 41 and also including a downloader downloading and e-mail message from an e-mail server.

44. The system of claim 41 and also including a mail forwarder forwarding the selected e-mail message to a pager.

45. The system of claim 41 and also including a mail forwarder forwarding the selected e-mail message to a fax machine.

46. A method of voice communication comprising the steps of:

providing a telephone network including a multiplicity of telephones interconnected by telephone network interconnections;

providing a computer network having a multiplicity of nodes;

enabling non-streaming Internet protocol communication between said nodes;

communicating to the telephone network a link to streaming audio via said non-streaming Internet protocol communication;

playing said streaming audio from said computer network over at least a portion of said telephone network interconnections;

playing by a local computer an incoming audio file containing a voice message, the incoming audio file residing on a remote computer; and saving the incoming audio file as a local audio file on the local computer after said playing steps.

47. The method of claim 46 wherein the incoming audio file is a streaming audio file.

48. The method of claim 47 wherein the streaming audio file if a RealAudio file.

49. The method of claim 46 wherein the local audio file is a Wave file.

50. The method of claim 46 wherein the local audio file is a compressed Wave file.

51. The method of claim 46 wherein the local audio file is a RealAudio file.

52. A communication system comprising:
- a telephone network including a multiplicity of telephones interconnected by telephone network interconnections;
- a computer network having a multiplicity of nodes and enabling non-streaming Internet protocol communication between said nodes;
- streaming audio link communication apparatus communicating to the telephone network a link to streaming audio via said non-streaming Internet protocol communication;
- a streaming audio player operative to play said streaming audio from said computer network over at least a portion of said telephone network interconnections;
- an audio player within a local computer playing an incoming audio file containing a voice message, the incoming audio file residing on a remote computer; and
- a data processor saving the incoming audio file as a local audio file on the local computer, after said audio player plays the incoming audio file.

53. The system of claim 52 wherein the incoming audio file is a streaming audio file.

54. The system of claim 53 wherein the streaming audio file is a RealAudio file.

55. The system of claim 52 wherein the local audio file is a Wave file.

56. The system of claim 52 wherein the local audio file is a compressed Wave file.

57. The system of claim 52 wherein the local audio file is a RealAudio file.

58. A communication system comprising:
- a telephone network including a multiplicity of telephones interconnected by telephone network interconnections;
- a computer network having a multiplicity of nodes and enabling non-streaming Internet protocol communication between said nodes;
- streaming audio link communication apparatus communicating to the telephone network a link to streaming audio via said non-streaming Internet protocol communication;
- a streaming audio player operative to play said streaming audio from said computer network over at least a portion of said telephone network interconnections;
- a text-to-speech converter converting an e-mail message from text to speech;
- a receiver receiving an input request for a selected e-mail message;
- a first audio player reading the selected e-mail message;
- an audio recorder recording a reply to the selected e-mail message, producing an audio file;
- a transmitter sending the audio file as an attachment to a reply e-mail; and
- a second audio player playing the audio file.

59. The system of claim 58 wherein the audio file is a Wave file.

60. The system of claim 58 wherein the audio file is a compressed Wave file.

61. The system of claim 60 and also comprising a decompressor decompressing the audio file.

62. A communication system comprising:
- a telephone network including a multiplicity of telephones interconnected by telephone network interconnections;
- a computer network having a multiplicity of nodes and enabling non-streaming Internet protocol communication between said nodes;
- streaming audio link communication apparatus communicating to the telephone network a link to streaming audio via said non-streaming Internet protocol communication;
- a streaming audio player operative to play said streaming audio from said computer network over at least a portion of said telephone network interconnections;
- a text-to-speech converter converting an e-mail message from text to speech;
- a receiver receiving an input request for a selected e-mail message;
- an audio recorder recording a reply to the selected e-mail message, producing an audio file;
- a computer storing the audio file;
- a transmitter sending a reply e-mail containing a link to the audio file;
- a second audio player playing the audio file; and
- a data processor saving the audio file.

63. The system of claim 62 wherein the audio file is a RealAudio file.

64. The system of 62 and wherein said data processor converts the audio file to a designated file format.

65. The system of claim 64 wherein the designated file format is a Wave format.

66. The system of claim 64 wherein the designated file format is a compressed Wave format.

67. A communication system comprising:
- a telephone network including a multiplicity of telephones interconnected by telephone network interconnections;
- a computer network having a multiplicity of nodes and enabling non-streaming Internet protocol communication between said nodes;
- streaming audio link communication apparatus communicating to the telephone network a link to streaming audio via said non-streaming Internet protocol communication;
- a streaming audio player operative to play said streaming audio from said computer network over at least a portion of said telephone network interconnections;
- a text-to-speech converter converting an e-mail message from text to speech;
- a receiver receiving an input request for a selected e-mail message;
- an audio player reading the selected e-mail message;
- an audio recorder recording a reply to the selected e-mail message and producing an audio file containing the recorded reply; and
- a transmitter sending the audio file to a computer and sending a reply e-mail containing a link to the audio file.

68. The system of claim 67 wherein the audio file is a RealAudio file.

69. The system of claim 67 and also including a downloader downloading an e-mail message from an e-mail server.

70. The system of claim 67 and also including a mail forwarder forwarding the selected e-mail message to a pager.

71. The system of claim 67 and also including a mail forwarder forwarding the selected e-mail messages to a fax machine.

72. A communication system comprising:
a telephone network including a multiplicity of telephones interconnected by telephone network interconnections;
a computer network having a multiplicity of nodes and enabling non-streaming Internet protocol communication between said nodes;
streaming audio link communication apparatus communicating to the telephone network a link to streaming audio via said non-streaming Internet protocol communication;
a streaming audio player operative to play said streaming audio from said computer network over at least a portion of said telephone network interconnections;
a text-to-speech converter converting an e-mail message from text to speech;
a receiver receiving an input request for a selected e-mail message;
a first audio player reading the selected e-mail message;
an audio recorder recording a reply to the selected e-mail message, and producing an audio file containing the recorded reply;
a transmitter sending the audio file to a computer and sending a reply e-mail containing a link to the audio file;
a second audio player playing the audio file; and
a data processor saving the audio file.

73. The system of claim 72 wherein the audio file is a RealAudio file.

74. The system of claim 72 and wherein said data processor converts the audio file to a designated file format.

75. The system of claim 74 wherein the designated file format is a Wave format.

76. The system of claim 74 wherein the designated file format is a compressed Wave format.

77. A method of voice communication comprising the steps of: providing a telephone network including a multiplicity of telephones interconnected by telephone network interconnections;
providing a computer network having a multiplicity of nodes;
enabling non-streaming Internet protocol communication between said nodes;
communicating to the telephone network a link to streaming audio via said non-streaming Internet protocol communication;
playing said streaming audio from said computer network over at least a portion of said telephone network interconnections;
enabling e-mail communication between said nodes;
providing a multiplicity of voice response computers, each voice response computer being connected to a node of said computer network; and
making each voice response computer actuable by an input received from one of said multiplicity of telephones via said telephone network for communicating voice received via said one of said multiplicity of telephones via e-mail over said computer network;
and also comprising the step of providing Instant Messaging protocol functionality whereby communications are sent to user-selected destinations via said computer network.

78. A method of voice communication comprising the steps of: providing a telephone network including a multiplicity of telephones interconnected by telephone network interconnections;
providing a computer network having a multiplicity of nodes;
enabling non-streaming Internet protocol communication between said nodes;
communicating to the telephone network a link to streaming audio via said non-streaming Internet protocol communication;
playing said streaming audio from said computer network over at least a portion of said telephone network interconnections;
enabling e-mail communication between said nodes;
providing a multiplicity of voice response computers, each voice response computer being connected to a node of said computer network; and
making each voice response computer actuable by an input received from one of said multiplicity of telephones via said telephone network for communicating voice received via said one of said multiplicity of telephones via e-mail over said computer network;
and also comprising the step of providing Instant Messaging protocol functionality whereby communications are sent to user-selected destinations via said computer network indicating that a user is communicating using a user's telephone via said telephone network with a users voice response computer.

79. A method of voice communication comprising the steps of: providing a telephone network including a multiplicity of telephones interconnected by telephone network interconnections;
providing a computer network having a multiplicity of nodes;
enabling non-streaming Internet protocol communication between said nodes;
communicating to the telephone network a link to streaming audio via said non-streaming Internet protocol communication;
playing said streaming audio from said computer network over at least a portion of said telephone network interconnections;
enabling e-mail communication between said nodes;
providing a multiplicity of voice response computers, each voice response computer being connected to a node of said computer network; and
making each voice response computer actuable by an input received from one of said multiplicity of telephones via said telephone network for communicating voice received via said one of said multiplicity of telephones via e-mail over said computer network;
and also comprising the step of providing Instant Message protocol functionality whereby communications are sent to user-selected destinations via said computer network indicating that a user has communicated voice via said telephone network and said computer network using a user's telephone and a users voice response computer.

80. A method of voice communication comprising the steps of: providing a telephone network including a multiplicity of telephones interconnected by telephone network interconnections;
providing a computer network having a multiplicity of nodes;
enabling non-streaming Internet protocol communication between said nodes;
communicating to the telephone network a link to streaming audio via said non-streaming Internet protocol communication;

playing said streaming audio from said computer network over at least a portion of said telephone network interconnections;

enabling e-mail communication between said nodes;

providing a multiplicity of voice response computers, each voice response computer being connected to a node of said computer network; and making each voice response computer actuable by an input received from one of said multiplicity of telephones via said telephone network for communicating voice received via said one of said multiplicity of telephones via e-mail over said computer network;

and wherein said voice response computers are operative to convert Dual Tone Multi Frequency (DTMF) to an Instant Messaging protocol communication protocol.

81. A method of voice communication comprising the steps of: providing a telephone network including a multiplicity of telephones interconnected by telephone network interconnections;

providing a computer network having a multiplicity of nodes;

enabling non-streaming Internet protocol communication between said nodes;

communicating to the telephone network a link to streaming audio via said non-streaming Internet protocol communication;

playing said streaming audio from said computer network over at least a portion of said telephone network interconnections;

enabling e-mail communication between said nodes;

providing a multiplicity of voice response computers, each voice response computer being connected to a node of said computer network; and making each voice response computer actuable by an input received from one of said multiplicity of telephones via said telephone network for communicating voice received via said one of said multiplicity of telephones via e-mail over said computer network;

wherein said voice response computers communicate with a database;

and wherein said database is a Structured Query Language (SQL) database.

82. A method of voice communication comprising the steps of: providing a telephone network including a multiplicity of telephones interconnected by telephone network interconnections;

providing a computer network having a multiplicity of nodes;

enabling non-streaming Internet protocol communication between said nodes;

communicating to the telephone network a link to streaming audio via said non-streaming Internet protocol communication;

playing said streaming audio from said computer network over at least a portion of said telephone network interconnections;

enabling e-mail communication between said nodes;

providing a multiplicity of voice response computers, each voice response computer being connected to a node of said computer network; and making each voice response computer actuable by an input received from one of said multiplicity of telephones via said telephone network for communicating voice received via said one of said multiplicity of telephones via e-mail over said computer network;

and comprising the step of actuating at least one of said voice response computers by choosing an e-mail address of a recipient from a pre-defined directory.

83. A method of voice communication comprising the steps of: providing a telephone network including a multiplicity of telephones interconnected by telephone network interconnections;

providing a computer network having a multiplicity of nodes;

enabling non-streaming Internet protocol communication between said nodes;

communicating to the telephone network a link to streaming audio via said non-streaming Internet protocol communication;

playing said streaming audio from said computer network over at least a portion of said telephone network interconnections;

enabling e-mail communication between said nodes;

providing a multiplicity of voice response computers, each voice response computer being connected to a node of said computer network; and making each voice response computer actuable by an input received from one of said multiplicity of telephones via said telephone network for communicating voice received via said one of said multiplicity of telephones via e-mail over said computer network;

and comprising the step of actuating at least one of said voice response computers by the entering an e-mail address of a recipient via DTMF codes.

84. A method of voice communication according to claim 83 and comprising the step of operating at least one of said voice response computers to store in a directory, e-mail addresses entered by a sender.

85. A method of voice communication comprising the steps of: providing a telephone network including a multiplicity of telephones interconnected by telephone network interconnections;

providing a computer network having a multiplicity of nodes;

enabling non-streaming Internet protocol communication between said nodes;

communicating to the telephone network a link to streaming audio via said non-streaming Internet protocol communication;

playing said streaming audio from said computer network over at least a portion of said telephone network interconnections;

enabling e-mail communication between said nodes;

providing a multiplicity of voice response computers, each voice response computer being connected to a node of said computer network; and making each voice response computer actuable by an input received from one of said multiplicity of telephones via said telephone network for communicating voice received via said one of said multiplicity of telephones via e-mail over said computer network;

and comprising the step of actuating at least one of said voice response computers by entering an e-mail address of a recipient via speech recognition by the at least one of said multiplicity of voice response computers.

86. A method of voice communication comprising the steps of:
  providing a telephone network including a multiplicity of telephones interconnected by telephone network interconnections;
  providing a computer network having a multiplicity of nodes;
  enabling non-streaming Internet protocol communication between said nodes;
  communicating to the telephone network a link to streaming audio via said non-streaming Internet protocol communication;
  playing said streaming audio from said computer network over at least a portion of said telephone network interconnections;
  enabling e-mail communication between said nodes;
  providing a multiplicity of voice response computers, each voice response computer being connected to a node of said computer network; and
  making each voice response computer actuable by an input received from one of said multiplicity of voice response computers via said computer network for receiving voice communicated via e-mail over said computer network and providing a voice output to a telephone via said telephone network;
  and also providing Instant Messaging protocol functionality whereby communications are sent from user-selected destinations via said computer network.

87. A method of voice communication comprising the steps of:
  providing a telephone network including a multiplicity of telephones interconnected by telephone network interconnections;
  providing a computer network having a multiplicity of nodes;
  enabling non-streaming Internet protocol communication between said nodes;
  communicating to the telephone network a link to streaming audio via said non-streaming Internet protocol communication;
  playing said streaming audio from said computer network over at least a portion of said telephone network interconnections;
  enabling e-mail communication between said nodes;
  providing a multiplicity of voice response computers, each voice response computer being connected to a node of said computer network; and
  making each voice response computer actuable by an input received from one of said multiplicity of voice response computers via said computer network for receiving voice communicated via e-mail over said computer network and providing a voice output to a telephone via said telephone network;
  and also providing Instant Messaging protocol functionality whereby communications are sent from user-selected destinations via said computer network indicating that a user is communicating using a user's telephone via said telephone network with a user's voice response computer.

88. A method of voice communication comprising the steps of:
  providing a telephone network including a multiplicity of telephones interconnected by telephone network interconnections;
  providing a computer network having a multiplicity of nodes;
  enabling non-streaming Internet protocol communication between said nodes;
  communicating to the telephone network a link to streaming audio via said non-streaming Internet protocol communication;
  playing said streaming audio from said computer network over at least a portion of said telephone network interconnections;
  enabling e-mail communication between said nodes;
  providing a multiplicity of voice response computers, each voice response computer being connected to a node of said computer network; and
  making each voice response computer actuable by an input received from one of said multiplicity of voice response computers via said computer network for receiving voice communicated via e-mail over said computer network and providing a voice output to a telephone via said telephone network;
  and also providing Instant Messaging protocol functionality whereby communications are sent from user-selected destinations via said computer network indicating that a user has communicated voice via said telephone network and said computer network using a user's telephone and a user's voice response computer.

89. A method of voice communication comprising the steps of:
  providing a telephone network including a multiplicity of telephones interconnected by telephone network interconnections;
  providing a computer network having a multiplicity of nodes;
  enabling non-streaming Internet protocol communication between said nodes;
  communicating to the telephone network a link to streaming audio via said non-streaming Internet protocol communication;
  playing said streaming audio from said computer network over at least a portion of said telephone network interconnections;
  enabling e-mail communication between said nodes;
  providing a multiplicity of voice response computers, each voice response computer being connected to a node of said computer network;
  making each voice response computer actuable by an input received from one of said multiplicity of telephones via said telephone network for communicating voice received via said one of said multiplicity of telephones via e-mail over said computer network;
  making each voice response computer also actuable by an input received from one of said multiplicity of voice response computers via said computer network for receiving voice communicated via e-mail over said computer network; and
  providing a voice output to a telephone via said telephone network;
  and also providing Instant Messaging protocol functionality whereby communications are sent to user-selected destinations via said computer network.

90. A method of voice communication comprising the steps of:
  providing a telephone network including a multiplicity of telephones interconnected by telephone network interconnections;

providing a computer network having a multiplicity of nodes;

enabling non-streaming Internet protocol communication between said nodes;

communicating to the telephone network a link to streaming audio via said non-streaming Internet protocol communication;

playing said streaming audio from said computer network over at least a portion of said telephone network interconnections;

enabling e-mail communication between said nodes;

providing a multiplicity of voice response computers, each voice response computer being connected to a node of said computer network;

making each voice response computer actuable by an input received from one of said multiplicity of telephones via said telephone network for communicating voice received via said one of said multiplicity of telephones via e-mail over said computer network;

making each voice response computer also actuable by an input received from one of said multiplicity of voice response computers via said computer network for receiving voice communicated via e-mail over said computer network; and providing a voice output to a telephone via said telephone network;

and also providing Instant Messaging protocol functionality whereby communications are sent to user-selected destinations via said computer network indicating that a user is communicating using a user's telephone via said telephone network with a user's voice response computer.

91. A method of voice communication comprising the steps of:

providing a telephone network including a multiplicity of telephones interconnected by telephone network interconnections;

providing a computer network having a multiplicity of nodes;

enabling non-streaming Internet protocol communication between said nodes communicating to the telephone network a link to streaming audio via said non-streaming Internet protocol communication;

playing said streaming audio from said computer network over at least a portion of said telephone network interconnections;

enabling e-mail communication between said nodes;

providing a multiplicity of voice response computers, each voice response computer being connected to a node of said computer network;

making each voice response computer actuable by an input received from one of said multiplicity of telephones via said telephone network for communicating voice received via said one of said multiplicity of telephones via e-mail over said computer network;

making each voice response computer also actuable by an input received from one of said multiplicity of voice response computers via said computer network for receiving voice communicated via e-mail over said computer network; and providing a voice output to a telephone via said telephone network;

and also providing Instant Messaging protocol functionality whereby communications are sent to user-selected destinations via said computer network indicating that a user has communicated voice via said telephone network and said computer network using a user's telephone and a user's voice response computer.

92. A method of voice communication comprising the steps of:

providing a telephone network including a multiplicity of telephones interconnected by telephone network interconnections;

providing a computer network having a multiplicity of nodes;

enabling non-streaming Internet protocol communication between said nodes;

communicating to the telephone network a link to streaming audio via said non-streaming Internet protocol communication;

playing said streaming audio from said computer network over at least a portion of said telephone network interconnections;

enabling e-mail communication between said nodes;

connecting a multiplicity of voice response computers, each voice response computer to a node of said computer network; and making actuable at least one of said voice response computers by an input received from one of said multiplicity of telephones via said telephone network for communicating voice received via said one of said multiplicity of telephones via a non-streaming Internet protocol over said computer network;

and also providing Instant Messaging protocol functionality whereby communications are sent to user-selected destinations via said computer network.

93. A method of voice communication comprising the steps of:

providing a telephone network including a multiplicity of telephones interconnected by telephone network interconnections;

providing a computer network having a multiplicity of nodes;

enabling non-streaming Internet protocol communication between said nodes;

communicating to the telephone network a link to streaming audio via said non-streaming Internet protocol communication;

playing said streaming audio from said computer network over at least a portion of said telephone network interconnections;

enabling e-mail communication between said nodes;

connecting a multiplicity of voice response computers, each voice response computer to a node of said computer network; and making actuable at least one of said voice response computers by an input received from one of said multiplicity of telephones via said telephone network for communicating voice received via said one of said multiplicity of telephones via a non-streaming Internet protocol over said computer network;

and also providing Instant Messaging protocol functionality whereby communications are sent to user-selected destinations via said computer network indicating that a user is communicating using a user's telephone via said telephone network with a user's voice response computer.

94. A method of voice communication comprising the steps of:
   providing a telephone network including a multiplicity of telephones interconnected by telephone network interconnections;
   providing a computer network having a multiplicity of nodes;
   enabling non-streaming Internet protocol communication between said nodes;
   communicating to the telephone network a link to streaming audio via said non-streaming Internet protocol communication;
   playing said streaming audio from said computer network over at least a portion of said telephone network interconnections;
   enabling e-mail communication between said nodes;
   connecting a multiplicity of voice response computers, each voice response computer to a node of said computer network; and
   making actuable at least one of said voice response computers by an input received from one of said multiplicity of telephones via said telephone network for communicating voice received via said one of said multiplicity of telephones via a non-streaming Internet protocol over said computer network;
   and also providing Instant Messaging protocol functionality whereby communications are sent to user-selected destinations via said computer network indicating that a user has communicated voice via said telephone network and said computer network using a user's telephone and a user's voice response computer.

95. A method of voice communication comprising the steps of:
   providing a telephone network including a multiplicity of telephones interconnected by telephone network interconnections;
   providing a computer network having a multiplicity of nodes;
   enabling non-streaming Internet protocol communication between said nodes;
   communicating to the telephone network a link to streaming audio via said non-streaming Internet protocol communication;
   playing said streaming audio from said computer network over at least a portion of said telephone network interconnections;
   enabling e-mail communication between said nodes;
   connecting a multiplicity of voice response computers, each voice response computer to a node of said computer network; and
   making actuable at least one of said voice response computers by an input received from one of said multiplicity of telephones via said telephone network for communicating voice received via said one of said multiplicity of telephones via a non-streaming Internet protocol over said computer network;
   and comprising the step of operating said voice response computers to convert Dual Tone Multi Frequency (DTMF) to an Instant Messaging protocol communication protocol.

96. A method of voice communication comprising the steps of:
   providing a telephone network including a multiplicity of telephones interconnected by telephone network interconnections;
   providing a computer network having a multiplicity of nodes;
   enabling non-streaming Internet protocol communication between said nodes;
   communicating to the telephone network a link to streaming audio via said non-streaming Internet protocol communication;
   playing said streaming audio from said computer network over at least a portion of said telephone network interconnections;
   enabling e-mail communication between said nodes;
   connecting a multiplicity of voice response computers, each voice response computer to a node of said computer network; and
   making actuable at least one of said voice response computers by an input received from one of said multiplicity of telephones via said telephone network for communicating voice received via said one of said multiplicity of telephones via a non-streaming Internet protocol over said computer network;
   and comprising the step of actuating multiplicity of voice response computers is by choosing an e-mail address of a recipient from a pre-defined directory.

97. A method of voice communication comprising the steps of:
   providing a telephone network including a multiplicity of telephones interconnected by telephone network interconnections;
   providing a computer network having a multiplicity of nodes;
   enabling non-streaming Internet protocol communication between said nodes;
   communicating to the telephone network a link to streaming audio via said non-streaming Internet protocol communication:
   playing said streaming audio from said computer network over at least a portion of said telephone network interconnections;
   enabling e-mail communication between said nodes;
   connecting a multiplicity of voice response computers, each voice response computer to a node of said computer network; and
   making actuable at least one of said voice response computers by an input received from one of said multiplicity of telephones via said telephone network for communicating voice received via said one of said multiplicity of telephones via a non-streaming Internet protocol over said computer network;
   and comprising the step of actuating said multiplicity of voice response computers by entering an e-mail address of a recipient via Dual Tone Multi Frequency (DTMF) codes.

98. A method of voice communication according to claim 97 and comprising the step of operating said multiplicity of voice response computers to store in a directory e-mail addresses entered by a sender.

99. A method of voice communication comprising the steps of:
   providing a telephone network including a multiplicity of telephones interconnected by telephone network interconnections;
   providing a computer network having a multiplicity of nodes;
   enabling non-streaming Internet protocol communication between said nodes;

communicating to the telephone network a link to streaming audio via said non-streaming Internet protocol communication;

playing said streaming audio from said computer network over at least a portion of said telephone network interconnections;

enabling e-mail communication between said nodes;

connecting a multiplicity of voice response computers, each voice response computer to a node of said computer network; and making actuable at least one of said voice response computers by an input received from one of said multiplicity of telephones via said telephone network for communicating voice received via said one of said multiplicity of telephones via a non-streaming Internet protocol over said computer network;

and comprising the step of actuating said multiplicity of voice response computers by the entering an e-mail address of a recipient via speech recognition by one of said multiplicity of voice response computers.

100. A method of voice communication comprising the steps of:

providing a telephone network including a multiplicity of telephones interconnected by telephone network interconnections;

providing a computer network having a multiplicity of nodes;

enabling non-streaming Internet protocol communication between said nodes;

communicating to the telephone network a link to streaming audio via said non-streaming Internet protocol communication;

playing said streaming audio from said computer network over at least a portion of said telephone network interconnections;

connecting a multiplicity of voice response computers, each voice response computer being connected to a node of said computer network; and actuating an input received from one of said multiplicity of voice response computers via said computer network for receiving voice communicated via a non-streaming internet protocol over said computer network and providing a voice output to a telephone via said telephone network, the method also providing Instant Messaging protocol functionality whereby communications are sent from user-selected destinations via said computer network indicating that a user has communicated voice via said telephone network and said computer network using a user's telephone and a user's voice response computer.

101. A method of voice communication according to claim 100 and also providing Instant Messaging protocol functionality whereby communications are sent from user-selected destinations via said computer network indicating that a user is communicating using a user's telephone via said telephone network with a user's voice response computer.

102. A method of voice communication according to claim 100 and comprising the step of using at least one of said voice response computers to sense the presence of a link to an audio file.

103. A method of voice communication according to claim 102 and comprising the step of being capable of accessing said audio file via said link for playing said audio file to a recipient.

104. A method of voice communication according to claim 102 and wherein said voice response computers are capable of sensing the presence of a link to an audio file in e-mail received thereat.

105. A method of voice communication comprising the steps of:

providing a telephone network including a multiplicity of telephones interconnected by telephone network interconnections;

providing a computer network having a multiplicity of nodes;

enabling non-streaming Internet protocol communication between said nodes;

communicating to the telephone network a link to streaming audio via said non-streaming Internet protocol communication;

playing said streaming audio from said computer network over at least a portion of said telephone network interconnections, enabling e-mail communication between said nodes;

connecting at least one voice response computer of a multiplicity of voice response computers to a node of said computer network; and actuating a voice response computer by an input received from one of said multiplicity of telephones via said telephone network for communicating voice received via said one of said multiplicity of telephones via a non streaming Internet protocol over said computer network, each voice response computer also being actuable by an input received from one of said multiplicity of voice response computers via said computer network for receiving voice communicated via a non-streaming Internet protocol over said computer network and providing a voice output to a telephone via said telephone network;

and also providing Instant Messaging protocol functionality whereby communications are sent to user-selected destinations via said computer network.

106. A method of voice communication according to claim 105 and also providing Instant Messaging protocol functionality whereby communications are sent to user-selected destinations via said computer network indicating that a user has communicated voice via said telephone network and said computer network using a user's telephone and a user's voice response computer.

107. A method of voice communication comprising the steps of:

providing a telephone network including a multiplicity of telephones interconnected by telephone network interconnections;

providing a computer network having a multiplicity of nodes;

enabling non-streaming Internet protocol communication between said nodes;

communicating to the telephone network a link to streaming audio via said non-streaming Internet protocol communication;

playing said streaming audio from said computer network over at least a portion of said telephone network interconnections;

enabling e-mail communication between said nodes;

connecting at least one voice response computer of a multiplicity of voice response computers to a node of said computer network; and actuating a voice response computer by an input received from one of said multiplicity of telephones via said telephone network for communicating voice received via said one of said multiplicity of telephones via a non streaming Internet protocol over said computer network, each voice response computer also being actuable by an input received from one of said multiplicity of voice response computers via said computer network for receiving voice communicated via a non-streaming Internet protocol over said computer network and providing a voice output to a telephone via said telephone network;

and also providing Instant Messaging protocol functionality whereby communications are sent to user-selected destinations via said computer network indicating that a user is communicating using a user's telephone via said telephone network with a user's voice response computer.

108. A method of voice communication comprising the steps of:

providing a telephone network including a multiplicity of telephones interconnected by telephone network interconnections, wherein said telephone network comprises a cellular telephone network;

providing a computer network having a multiplicity of nodes;

enabling non-streaming Internet protocol communication between said nodes;

communicating to the telephone network a link to streaming audio via said non-streaming Internet protocol communication;

playing said streaming audio from said computer network over at least a portion of said telephone network interconnections;

connecting at least one computer of multiplicity of computers, to a node of said computer network; and actuating at least one of said computers by an input received from one of said multiplicity of telephones via said telephone network for communicating messages received via said one of said multiplicity of telephones via a telephone compatible Internet communication language over said computer network, at least one of senders or recipients of said messages being user-selected buddies.

109. A method of voice communication comprising the steps of:

providing a telephone network including a multiplicity of telephones interconnected by telephone network interconnections, wherein said telephone network comprises a cellular telephone network;

providing a computer network having a multiplicity of nodes;

enabling non-streaming Internet protocol communication between said nodes;

communicating to the telephone network a link to streaming audio via said non-streaming Internet protocol communication;

playing said streaming audio from said computer network over at least a portion of said telephone network interconnections;

connecting at least one computer of multiplicity of computers, to a node of said computer network; and actuating at least one of said computers by and input received from one of said multiplicity of voice response computers via said computer network for receiving messages communicated via a telephone compatible Internet communication language over said computer network and providing to telephone compatible Internet communication language output to a telephone via a said telephone network, at least one of senders or recipients of said messages being user-selected buddies.

110. A method of voice communication comprising the steps of:

providing a telephone network including a multiplicity of telephones interconnected by telephone network interconnections, wherein said telephone network comprises a cellular network;

providing a computer network having a multiplicity of nodes;

enabling non-streaming Internet protocol communication between said nodes;

communicating to the telephone network a link to streaming audio via said non-streaming Internet protocol communication;

playing said streaming audio from said computer network over at least a portion of said telephone network interconnections;

connecting at least one computer of multiplicity of computers to a node of said computer network; and actuating at least one of said computers by an input received from one of said multiplicity of telephones via said telephone network for communicating messages received via said one of said multiplicity of telephones via a telephone compatible Internet communication language over said computer network, each computer also being actuable by an input received from one of said multiplicity of computers via said computer network for receiving messages communicated over said computer network and providing a telephone compatible Internet communication language output to a telephone via said telephone network, at least one of senders or recipients of said messages being user-selected buddies.

111. A method of voice communication comprising the steps of:

providing a telephone network including a multiplicity of telephones interconnected by telephone network interconnections;

providing a computer network having a multiplicity of nodes;

enabling non-streaming Internet protocol communication between said nodes;

communicating to the telephone network a link to streaming audio via said non-streaming Internet protocol communication;

playing said streaming audio from said computer network over at least a portion of said telephone network interconnections;

providing a recorder recording a senders voice;

providing a web-server storing the senders voice; and providing a notifier sending a notification to at least one recipient, said notification containing a link enabling retrieval of sender's voice from said web server;

and comprising the step of storing the senders voice together with the meta-information associated therewith in a single storage unit of said web server.

112. A method of voice communication according to claim 111 and comprising the step of spooling the sender's voice to a local storage facility in said recorder.

113. A method of voice communication according to claim 111 and also comprising the step of transmitting a sender's voice from a transmitter.

114. A method of voice communication according to claim 113 and comprising the step of transmitting said sender's voice via Hypertext Transfer Protocol (HTTP) PUT to said web server of said transmitter.

115. A method of voice communication according to claim 113 and comprising the step of spooling the sender's voice to a Simple Mail Transfer Protocol (SMTP) server of said transmitter.

116. A method of voice communication according to claim 113 and comprising the step of encoding a sender's voice in a compressed format in said transmitter.

117. A method of voice communication according to claim 113 and comprising the step of including a Simple Mail Transfer Protocol (SMTP) server in said web server.

118. A method of voice communication according to claim 113 and comprising the step of including a Hypertext Transfer Protocol (HTTP) server enabled to handle PUT commands in said web server.

119. A method of voice communication comprising the steps of:
providing a telephone network including a multiplicity of telephones interconnected by telephone network interconnections;
providing a computer network having a multiplicity of nodes;
enabling non-streaming Internet protocol communication between said nodes;
communicating to the telephone network a link to streaming audio via said non-streaming Internet protocol communication;
playing said streaming audio from said computer network over at least a portion of said telephone network interconnections;
providing a recorder recording a senders voice;
providing a web-server storing the senders voice; and
providing a notifier sending a notification to at least one recipient, said notification containing a link enabling retrieval of sender's voice from said web server;
and comprising the step of operating said web server to encode multiple senders voices simultaneously.

120. A method of voice communication comprising the steps of:
providing a telephone network including a multiplicity of telephones interconnected by telephone network interconnections;
providing a computer network having a multiplicity of nodes;
enabling non-streaming Internet protocol communication between said nodes;
communicating to the telephone network a link to streaming audio via said non-streaming Internet protocol communication;
playing said streaming audio from said computer network over at least a portion of said telephone network interconnections;
providing a recorder recording a senders voice;
providing a web-server storing the senders voice; and
providing a notifier sending a notification to at least one recipient, said notification containing a link enabling retrieval of sender's voice from said web server;
and comprising the step of including a functionality which associates user preferences with recorded user voice elements in said web server.

121. A method of voice communication comprising the steps of:
providing a telephone network including a multiplicity of telephones interconnected by telephone network interconnections;
providing a computer network having a multiplicity of nodes;
enabling non-streaming Internet protocol communication between said nodes;
communicating to the telephone network a link to streaming audio via said non-streaming Internet protocol communication;
playing said streaming audio from said computer network over at least a portion of said telephone network interconnections;
providing a recorder recording a senders voice;
providing a web-server storing the senders voice; and
providing a notifier sending a notification to at least one recipient, said notification containing a link enabling retrieval of sender's voice from said web server;
and comprising the step of including the following functionality:
formatting the notification for a plurality of participants as a function of at least one parameter of each recipient.

122. A method of voice communication comprising the steps of:
providing a telephone network including a multiplicity of telephones interconnected by telephone network interconnections;
providing a computer network having a multiplicity of nodes;
enabling non-streaming Internet protocol communication between said nodes;
communicating to the telephone network a link to streaming audio via said non-streaming Internet protocol communication;
playing said streaming audio from said computer network over at least a portion of said telephone network interconnections;
providing a recorder recording a senders voice;
providing a web-server storing the senders voice; and
providing a notifier sending a notification to at least one recipient, said notification containing a link enabling retrieval of sender's voice from said web server;
and comprising the step of connecting said link to at least an advertising medium.

123. A method of voice communication according to claim 122 and also comprising the step of connecting said link also connects to an audio file.

124. A method of voice communication comprising the steps of:
providing a telephone network including a multiplicity of telephones interconnected by telephone network interconnections;
providing a computer network having a multiplicity of nodes;
enabling non-streaming Internet protocol communication between said nodes;
communicating to the telephone network a link to streaming audio via said non-streaming Internet protocol communication;
playing said streaming audio from said computer network over at least a portion of said telephone network interconnections;

enabling e-mail communication between said nodes;

connecting at least one database to said computer network; and storing e-mail communications between said nodes;

connecting at least one voice response computer at a node of said computer network, said at least one voice response computer being capable of accessing said at least one database;

and comprising the step of interposing at least one proxy interposed between said at least one voice response computer and said at least one database.

125. A method of voice communication comprising the steps of:

providing a telephone network including a multiplicity of telephones interconnected by telephone network interconnections;

providing a computer network having a multiplicity of nodes;

enabling non-streaming Internet protocol communication between said nodes;

communicating to the telephone network a link to streaming audio via said non-streaming Internet protocol communication;

playing said streaming audio from said computer network over at least a portion of said telephone network interconnections;

enabling e-mail communication between said nodes;

connecting at least one database to said computer network; and storing e-mail communications between said nodes;

and wherein each of said multiplicity of databases contains a plurality of mail tables, wherein each mail table has assigned thereto a limited number of users.

126. A method of voice communication comprising the steps of:

providing a telephone network including a multiplicity of telephones interconnected by telephone network interconnections;

providing a computer network having a multiplicity of nodes;

enabling non-streaming Internet protocol communication between said nodes;

communicating to the telephone network a link to streaming audio via said non-streaming Internet protocol communication;

playing said streaming audio from said computer network over at least a portion of said telephone network interconnections;

enabling e-mail communication between said nodes;

connecting at least one database to said computer network; and storing e-mail communications between said nodes;

and wherein at least one of said multiplicity of databases includes a list of destination addresses.

127. A method of voice communication according to claim 126 and wherein said list comprises a multiplicity of lists of destination addresses.

128. A method of voice communication according to claim 127 and wherein at least one of said multiplicity of databases includes a meta-list for indexing said multiplicity of lists.

* * * * *